United States Patent
Zheng et al.

(10) Patent No.: US 11,030,690 B2
(45) Date of Patent: Jun. 8, 2021

(54) METHOD AND APPARATUS FOR MATCHING BUYERS WITH SELLERS IN A MARKETPLACE TO FACILITATE TRADE

(71) Applicant: City University of Hong Kong, Kowloon (HK)

(72) Inventors: Liang Zheng, Kowloon (HK); Chee Wei Tan, Kowloon (HK)

(73) Assignee: City University of Hong Kong, Kowloon (HK)

(*) Notice: Subject to any disclaimer, the term of this patent is extended or adjusted under 35 U.S.C. 154(b) by 635 days.

(21) Appl. No.: 14/840,337

(22) Filed: Aug. 31, 2015

(65) Prior Publication Data
US 2017/0032461 A1    Feb. 2, 2017

Related U.S. Application Data

(63) Continuation-in-part of application No. 14/812,034, filed on Jul. 29, 2015, now abandoned.

(51) Int. Cl.
*G06Q 40/04*    (2012.01)

(52) U.S. Cl.
CPC .................. *G06Q 40/04* (2013.01)

(58) Field of Classification Search
CPC ....................................... G06Q 40/04
USPC ..................................... 705/35–40
See application file for complete search history.

(56) References Cited

U.S. PATENT DOCUMENTS 8,266,011 B2 * 9/2012 Torrenegra ......... G06Q 30/0601
                                                          705/26.3
2001/0047323 A1 * 11/2001 Schmidt .................. G06Q 40/04
                                                          705/37
2005/0038732 A1 * 2/2005 Sweeting ............... G06Q 40/04
                                                          705/37
2014/0370848 A1 * 12/2014 Petcavich ............. H04M 15/51
                                                          455/406
2015/0379596 A1 * 12/2015 Li ........................ G06Q 10/083
                                                          705/26.2
2016/0088461 A1 * 3/2016 Jiang ..................... H04M 15/54
                                                          455/432.1

OTHER PUBLICATIONS

Sung Ho, Sang Chan; Matching Buyer and Supplier, An intelligent Dynamic Exchange Model; Jul. 1, 2001. IEEE vol. 16 ,issue 4 pp. 28-40. (Year: 2001).*

* cited by examiner

*Primary Examiner* — Bruce I Ebersman
*Assistant Examiner* — John A Anderson
(74) *Attorney, Agent, or Firm* — Renner Kenner Greive Bobak Taylor & Weber

(57) ABSTRACT

A method for matching one or more buyers with one or more sellers to facilitate trade in a marketplace provided by a service provider includes the steps of receiving a bid to sell mobile data from one or more sellers, receiving a bid to buy mobile data from one or more buyers, matching at least a portion of the bid of the one or more buyers with at least a portion of the bid of the one or more sellers based on: a revenue maximization function to maximize the service provider's revenue based on a relationship between administration revenue and bid revenue, facilitating a transfer of the mobile data from the one or more seller to the one or more buyer, following the matching of the one or more buyers with the one or more sellers, through the service provider.

22 Claims, 6 Drawing Sheets

METHOD AND APPARATUS FOR MATCHING BUYERS WITH SELLERS IN A MARKETPLACE TO FACILITATE TRADE

CROSS-REFERENCE TO RELATED APPLICATIONS

This application is a Continuation in Part application of U.S. Non-Provisional application Ser. No. 14/812,034, filed Jul. 29, 2015, incorporated herein by reference.

TECHNICAL FIELD

The present invention relates to a method and apparatus for matching buyers with sellers in a marketplace to facilitate trade of assets, in particular the present invention relates to a method and apparatus for matching one or more buyers with one or more sellers in an online marketplace for trading mobile data.

BACKGROUND

Secondary markets exist for trading various commodities. A secondary market is one where consumers trade with each other directly rather than with an issuing or underwriting organization like a bank. Examples of commodities traded on a secondary market are intellectual property rights, shares and financial securities.

Mobile data is a commodity that is currently traded as on a primary market. In a primary market a service provider (e.g. An internet service provider) sells mobile data to consumers. A primary market model limits the amount of data that can be traded because consumers buy direct from the service provider. Many Internet service providers (ISPs) are facing large growth in network traffic. In order to control this growth, ISP's have attempted to limit excessive data usage by charging users a fee for a maximum amount of data usage within a month, i.e., a monthly data cap. Data usage over the cap requires paying steep overage fees, and cannot be rolled over into subsequent months. Other types of pricing plans that can relieve congestion include time-dependent pricing. This type of pricing scheme can be useful since there is variation in the data demands of various users, some users may use relatively little data within their data caps, while others may exceed their data caps.

Some ISPs offer shared data plans. Such plans allow data caps to be shared across multiple users and devices; thus, users with huge data demand can reduce the likelihood of exceeding their data caps by sharing a cap with other users who have less data demand. Yet most users only share these data plans with their immediate family. If all the family members use similar amounts of data, they may still use significantly less or significantly more data than their shared data cap. Most users are inclined not to share data with other unknown users, but users are likely to sell excess data to other unknown users.

SUMMARY OF THE INVENTION

In accordance with an aspect of the invention there is provided, a method for matching one or more buyers with one or more sellers to facilitate trade in a marketplace provided by a service provider, the method comprising the steps of:
receiving a bid to sell mobile data from one or more sellers,
receiving a bid to buy mobile data from one or more buyers,
matching at least a portion of the bid of the one or more buyers with at least a portion of the bid of the one or more sellers based on:
a revenue maximization function to maximize the service provider's revenue based on a relationship between administration revenue and bid revenue,
facilitating a transfer of the mobile data from the one or more seller to the one or more buyer, following the matching of the one or more buyers with the one or more sellers, through the service provider.

In an embodiment the administration revenue is generated by the service provider charging an administration fee for matching one or more buyers with one or more sellers, the administration fee being proportional to the amount of mobile data traded and the bid revenue is generated by the difference between the bid of the one or more buyers and the bid of the one or more sellers.

In an embodiment the bid relates to a price and an amount of data associated with that price, the buyer bid relating to a price the buyer is willing to pay for an amount of mobile data and the seller bid relating to the price the seller is wants to receive for an amount of mobile data.

In an embodiment the matching step comprises the additional steps of:
determining an optimal buyer bid,
determining an optimal seller bid,
providing the optimal buyer bid to the one or more buyers; and
providing the optimal seller bid to the one or more buyers.

In an embodiment, the method comprises the additional step of tracking trading dynamics of the online marketplace.

In an embodiment, the step of tracking trading dynamics comprises the additional steps of:
determining the value of bids supplied by the one or more buyers and the value of bids supplied by one or more sellers,
determining the number of matchings of the one or more buyers and the one or more sellers.

In an embodiment, the step of determining an optimal seller bid comprises the steps of:
determining a seller utility that relates to utility from selling mobile data
determining a seller utility maximization that relates to the maximum amount of data the seller is willing to sell as a function of the bid value.

In an embodiment the step of determining the optimal seller bid comprises the step of determining an optimal amount of mobile data the seller is willing to sell as a function of the bid value.

In an embodiment the seller utility is determined using the following expression:

$$(o_j^s - s_j^\star)(\sigma_j - \rho) = V_j^s(d_j^s - s_j^\star) - \int_{d_j^s - o_j^s}^{d_j^s - s_j^\star} V_j^s(c_j^s) f(c_j^s) dc_j^s.$$

wherein $s_j^\star$ is the optimal seller bid, $o_j^s$ relates to left over data of the seller, $\sigma_j$ relates to the seller price, $\rho$ relates to the administration fee, $f(c_j^s)$ relates to a delta distribution of the seller mobile data usage; and wherein the optimal seller bid can be mathematically determined using the seller utility expression.

In an embodiment the seller utility maximization is mathematically determined using the seller utility, and the seller utility maximization is determined as an amount of data to be sold, using a mathematical relationship relating at least the administration fee, seller price, mobile data cap of the seller and left over mobile data of the seller.

In an embodiment the seller utility maximization is determined using the following expression:
Initialize $s(o) \in (0, o^s)$.
1) The jth seller updates the data caps to be sold:

$$s_j(k+1) = o_j^s - \frac{1}{\sigma_j - \rho} V_j^s(d_j^s - s_j(k)) + \frac{1}{\sigma_j - \rho} \int_{d_j^s - o_j^s}^{d_j^s - s_j(k)} V_j^s(c_j^s) f(c_j^s) dc_j^s.$$

2) Normalize $s_j(k+1)$:

$$s_j(k+1) \leftarrow \min\left\{ s_j(k+1), d_j^s - \left( \frac{\theta_j^s(d_j^s + \alpha_j^s o_j^s)}{2 d_j^s (\sigma - \rho)} \right)^{\frac{1}{\alpha_j^s}} \right\}$$

wherein the utility maximization expression is used to determine amount of data a seller should sell for achieving maximum utility, wherein $s_j(k+1)$ relates to the amount of data the seller should sell, which relates to the optimal seller bid.

In an embodiment the step of determining an optimal buyer bid comprises the step of:
determining a buyer utility that relates to the utility of the buyer from buying mobile data,
determining a buyer utility maximization, the buyer utility maximization relates to the maximum amount mobile data the buyer is willing to buy as a function of the bid value.

In an embodiment the step of determining the optimal buyer bid comprises the step of determining an optimal amount of mobile data the buyer is willing to buy as a function of the bid value.

In an embodiment the buyer utility is determined using the following function:

$$(o_l^b + b_l^\star) \pi_l = V_l^b(d_l^b + b_l^\star) - \int_{d_l^b - o_l^b}^{d_l^b + b_l^\star} V_l^b(c_l^b) f(c_l^b) dc_l^b.$$

wherein $b^\star_l$ relates to the optimal buyer bid, $o_l^b$ relates to left over mobile data for the buyer, $d_l^b$ relates to the data cap for the buyer, $c_l^b$ relates to the buyers monthly usage, $f(c_l^b)$ relates to the a random variable with a distribution between the minimum buyer data usage and maximum buyer data usage, $\pi_l$ relates to the buyers purchase price; and
wherein the optimal buyer bid can be mathematically determined using the buyer utility function.

In an embodiment the buyer utility maximization is determined as an amount of data to be purchased, using a mathematical relationship relating at least the amount of data to be purchased with a buyer's price, a mobile data cap of the buyer and the expected buyer's monthly usage.

In an embodiment the buyer utility maximization is determined using the following expression:
Initialize $b(0) \in \mathbb{R}_+^L$.
1) The lth buyer updates the amount of data to be purchased:

$$b_l(k+1) = \frac{1}{\pi_l} V_l^b(d_l^b + b_l(k)) - \frac{1}{\pi_l} \int_{d_l^b - o_l^b}^{d_l^b + b_l(k)} V_l^b(c_l^b) f(c_l^b) dc_l^b - o_l^b.$$

2) Normalize $b(k+1)$:

$$b_l(k+1) \leftarrow \min\left\{ b_l(k+1), \left( \frac{\theta_l^b(d_l^b + \alpha_l^b o_l^b)}{2 d_l^b \pi_l} \right)^{\frac{1}{\alpha_l^b}} - d_l^b \right\}.$$

wherein the buyer utility maximization expression is used to determine amount of data the buyer should buy to achieve utility maximization and wherein $b_l(k+1)$ relates to the amount of mobile data the buyer should purchase.

In an embodiment the revenue maximization function comprises a:
a matching matrix that relates a percentage of a buyer bid that is satisfied by the seller bid,
maximizing the matching matrix to determine a maximum revenue for the service provider.

In an embodiment the maximizing the matching matrix and the revenue maximization function is determined by solving the linear program:

$$\underset{\Omega}{\text{maximize}} \; \omega \rho \sum_{j=1}^{J} \sum_{l=1}^{L} \Omega_{l,j} b_l + (1 - \omega) \sum_{l=1}^{L} \sum_{j=1}^{J} (\Omega_{l,j} b_l \pi_l - \Omega_{l,j} b_l \sigma_j)$$

subject to $\Omega \in B \cap S \cap \Pi \cap \Sigma; \Omega \geq 0.$ wherein $\Omega$ relates to the matching matrix, $$\rho \sum_{j=1}^{J} \sum_{l=1}^{L} \Omega_{l,j} b_l$$

relates to the administration revenue, $$(1 - \omega) \sum_{l=1}^{L} \sum_{j=1}^{J} (\Omega_{l,j} b_l \pi_l - \Omega_{l,j} b_l \sigma_l)$$

relates to the bid revenue,
$\Omega \in B \cap S \cap \Pi \cap \Sigma; \Omega \geq 0$ relate to various matching constraints for a buyer bid and a seller bid, the revenue maximization program outputting a maximized matching matrix, and;
$\omega$ relates to a weighting parameter that controls whether the matching matrix is more weighted toward revenue from administration revenue or bid revenue.

In an embodiment the matching constraints comprise:
a buyer constraint based on the buyer price and the buyer amount of data
a seller constraint based on the seller price and the seller amount of data
a total money exchanged constraint, based on the relationship that the total money paid by all buyers for seller data must be at last the cost of the data.

In an embodiment the method comprises the additional steps of:
providing suggested bid values to a buyer and seller to optimize matching,
receiving updated bids from one or buyers and one or more sellers,
applying the matching step again to match buyers with sellers.

In an embodiment at least some of the updated bids reflect an active learning experienced by one or more buyers and one or more sellers in accordance with the suggested bid or the matching of a buyer and seller.

In accordance with another aspect of the present invention, there is provided an apparatus for matching one or more buyers with one or more sellers to facilitate trade of mobile data in a marketplace provided by a service provider, the apparatus comprising:

a processor, a user interface in electronic communication with the processor the processor being configured to receive a bid to sell mobile data from one or more sellers via the user interface, the processor being configured to receive a bid to buy mobile data from one or more buyers via the user interface, the processor configured to execute a matching operation to match at least a portion of the bid of the one or more buyers with at least a portion of the bid of the one or more sellers based on:

a revenue maximization function to maximize a service provider's revenue based on a relationship between administration revenue and bid revenue, facilitating a transfer of mobile data from the one or more seller to the one or more buyers following the matching of the one or more sellers with the one or more buyers, through the service provider.

In an embodiment as part of the matching operation:

the processor is configured to determine an optimal buyer bid, the processor configured to determine an optimal seller bid, the user interface configured to provide the one or more buyers with the optimal buyer bid, and the user interface configured provide the one or more sellers with the optimal seller bid via the user interface.

In an embodiment the apparatus comprises a web server, the web server is in electronic communication with the processor, the marketplace being an online web based marketplace that is hosted by the web server, and wherein the user interface is a web interface that allows interaction between the buyer and/or seller and the processor.

In an embodiment the processor is further configured to track trading dynamics of the online market place, the processor further configured to determine the value of bids supplied by the one or more buyers and the value of bids supplied by the one or more suppliers, and the processor configured to determine the matchings of the one or more buyers and the one or more buyers.

In an embodiment the processor is arranged to determine an optimal seller bid based on a seller utility and a seller utility maximization, the processor further configured to determine a seller utility, wherein the seller utility maximization that relates to the maximum amount of the seller is willing to sell as a function of a bid value.

In an embodiment the processor is arranged to determine an optimal buyer bid based on a buyer utility and a buyer utility maximization, the processor further configured to determine the buyer utility and the buyer utility maximization, wherein the buyer utility maximization that relates to the maximum amount of mobile data the buyer is willing to buy as a function of the bid value.

In an embodiment the processor is configured to determine seller utility by executing the following expression:

$$(o_j^s - s_j^\star)(\sigma_j - \rho) = V_j^s(d_j^s - s_j^\star) - \int_{d_j^s - o_j^s}^{d_j^s - s_j^\star} V_j^s(c_j^s) f(c_j^s) dc_j^s.$$

wherein $s^\star_j$ is the optimal seller bid, $o_j^s$ relates to left over data of the seller, $\sigma_j$ relates to the seller price, $\rho$ relates to the administration fee, $f(c_j^s)$ relates to a delta distribution of the seller mobile data usage and; wherein the expression is stored as is stored as a set of executable instructions on a non-transitory computer readable medium, the processor arranged to execute the instructions to determine the seller utility.

In an embodiment the processor is configured to determine the buyer utility by executing the following expression:

$$(o_l^b + b_l^\star)\pi_l = V_l^b(d_l^b + b_l^\star) - \int_{d_l^b - o_l^b}^{d_l^b + b_l^\star} V_l^b(c_l^b) f(c_l^b) dc_l^b.$$

wherein $b^\star_l$ relates to the optimal buyer bid, $o_l^b$ relates to left over mobile data for the buyer, $d_l^b$ relates to the data cap for the buyer, $c_l^b$ relates to the buyers monthly usage, $f(c_l^b)$ relates to the a random variable with a distribution between the minimum buyer data usage and maximum buyer data usage, $\pi_l$ relates to the buyers purchase price and; wherein the expression is stored as a set of executable instructions on a non transitory computer readable medium, the processor arranged to execute the instructions to determine the buyer utility.

In an embodiment the processor is configured to determine a matching matrix that relates a percentage of a buyer bid that is satisfied by the seller bid, the processor further configured to select the revenue maximization function that maximizes the matching matrix in order to achieve optimal matching of the buyers and sellers.

In an embodiment the processor is configured to determine seller utility maximization by executing the following expression:

Initialize $s(0) \in (0, o^s)$.

1) The jth seller updates the data caps to be sold:

$$s_j(k+1) = o_j^s - \frac{1}{\sigma_j - \rho} V_j^s(d_j^s - s_j(k)) + \frac{1}{\sigma_j - \rho} \int_{d_j^s - o_j^s}^{d_j^s - s_j(k)} V_j^s(c_j^s) f(c_j^s) dc_j^s.$$

2) Normalize $s_j(k+1)$:

$$s_j(k+1) \leftarrow \min\left\{ s_j(k+1), d_j^s - \left( \frac{\theta_j^s(d_j^s) + \alpha_j^s \, o_j^s}{2d_j^s(\sigma - \rho)} \right)^{\frac{1}{\alpha_j^s}} \right\}.$$

wherein the utility maximization expression is used to determine amount of data a seller should sell for achieving maximum utility, wherein $s_j(k+1)$ relates to the amount of data the seller should sell, which relates to the optimal seller bid, and wherein the expression is stored as a set of executable instructions on a non transitory computer readable medium, the processor arranged to execute the instructions to determine the seller utility maximization.

In an embodiment the processor is arranged to determine buyer utility maximization by executing the following expression:

Initialize $b(0) \in \mathbb{R}_+^L$.

1) The lth buyer updates the amount of data to be purchased:

$$b_l(k+1) = \frac{1}{\pi_l} V_l^b(d_l^b + b_l(k))$$

$$-\frac{1}{\pi_l} \int_{d_l^b - o_l^b}^{d_l^b + b_l(k)} V_l^b(c_l^b) f(c_l^b) dc_l^b - o_l^b.$$

2) Normalize $b_l(k+1)$:

$$b_l(k+1) \leftarrow \min\left\{b_l(k+1), \left(\frac{\theta_l^b(d_l^b + \alpha_l^b \, o_l^b)}{2d_l^b \pi_l}\right)^{\frac{1}{\alpha_l^b}} - d_l^b\right\}.$$

wherein the buyer utility maximization expression is used to determine amount of data the buyer should buy to achieve utility maximization and wherein $b_l(k+1)$ relates to the amount of mobile data the buyer should purchase, and wherein the expression is stored as a set of executable instructions on a non transitory computer readable medium, the processor arranged to execute the stored instructions to determine buyer utility maximization.

In an embodiment the matching matrix and the revenue maximization function is determined by solving the following expression:

$$\underset{\Omega}{\text{maximize}} \; \omega \rho \sum_{j=1}^{J} \sum_{l=1}^{L} \Omega_{l_j} b_l + (1-\omega) \sum_{l=1}^{L} \sum_{j=1}^{J} \left(\Omega_{l_j} b_l \pi_l - \Omega_{l_j} b_l \sigma_j\right)$$

subject to $\Omega \in B \cap S \cap \Pi \cap \Sigma; \Omega \geq 0$.

wherein $\Omega$ relates to the matching matrix, $$\rho \sum_{j=1}^{J} \sum_{l=1}^{L} \Omega_{l_j} b_l$$

relates to the administration revenue, $$(1-\omega) \sum_{l=1}^{L} \sum_{j=1}^{J} \left(\Omega_{l_j} b_l \pi_l - \Omega_{l_j} b_l \sigma_j\right)$$

relates to the bid revenue,
$\Omega \in B \cap S \cap \Pi \cap \Sigma; \Omega \geq 0$ relate to various matching constraints for a buyer bid and a seller bid, the revenue maximization function outputting a maximized matching matrix, and;
$\omega$ relates to a weighting parameter that controls whether the matching matrix is more weighted toward revenue from administration revenue or bid revenue, and
wherein the expression is stored as a set of executable instructions on a non transitory computer readable medium, the processor arranged to execute the stored instructions to determine the matching matrix and revenue maximization function.

In an embodiment the weight parameter is biased for increased revenue from administration revenue.

In an embodiment the weight parameter is biased for increased revenue from bid revenue.

In an embodiment the weight parameter is biased to a value of 1 to maximize matching and weight toward the revenue being generated from administration revenue only.

In accordance with another aspect of the present invention, there is provided an apparatus for matching one or more buyers with one or more sellers to facilitate trade of mobile data in a marketplace provided by a service provider, the apparatus comprising:
a processor,
a user interface in electronic communication with the processor,
the processor being configured to receive a bid to sell mobile data from one or more sellers via the user interface,
the processor being configured to receive a bid to buy mobile data from one or more buyers via the user interface,
the processor configured to execute a matching operation to match at least a portion of the bid of the one or more buyers with at least a portion of the bid of the one or more sellers based on:
the processor being arranged to determine an optimal buyer bid and the processor being arranged to determine an optimal seller bid, the processor configured to provide the optimal buyer bid and optimal seller bid to the buyer and seller respectively via the user interface,
facilitating a transfer of mobile data from the one or more seller to the one or more buyers following the matching of the one or more sellers with the one or more buyers.

In an embodiment the In an embodiment the processor is arranged to determine an optimal seller bid by determining a seller utility and a seller utility maximization, wherein the seller utility maximization relates to a maximum amount of data the seller is willing to sell as a function of a bid value, and the processor is arranged to determine an optimal buyer bid by determining a buyer utility and a buyer utility maximization, wherein the buyer utility maximization relates to a maximum amount of mobile data the buyer is willing to buy as a function of the bid value.

In an embodiment the processor configured to execute a matching operation to match at least a portion of the bid of the one or more buyers with at least a portion of the bid of the one or more sellers based on a revenue maximization function to maximize a service provider's revenue based on a relationship between administration revenue and bid revenue.

In an embodiment the processor is configured to determine a matching matrix that relates a percentage of a buyer bid that is satisfied by the seller bid, the processor further configured to select the revenue maximization function that maximizes the matching matrix in order to achieve optimal matching of the buyers and sellers.

In an embodiment the processor is configured to execute a matching operation to match at least a portion of the bid of the one or more buyers with at least a portion of the bid of the one or more sellers with a revenue maximization function set to zero, such that no fees are charged by service provider.

In an embodiment the processor is configured to execute a matching operation to match at least a portion of the bid of the one or more buyers with at least a portion of the bid of the one or more sellers to maximize matching based on at least one of a seller utility maximization or buyer utility maximization.

In an embodiment the processor is configured to execute a matching operation to maximize matching of a buyer and seller in order to maximize transfer of data from the seller to the buyer.

While the invention has been described with reference to a number of preferred embodiments it should be appreciated that the invention can be embodied in many other forms.

In this specification, the word "comprising" and its variations, such as "comprises", has its usual meaning in accordance with International patent practice. That is, the word does not preclude additional or unrecited elements, substances or method steps, in addition to those specifically recited. Thus, the described apparatus, substance or method may have other elements, substances or steps in various embodiments of the invention. The purpose of the claims is to define the features which make up the invention and not necessarily all features which a working embodiment of the apparatus, substance or method, to which the invention defines, may have. The apparatus, substance or method defined in the claims may therefore include other elements, steps or substances as well as the inventive elements, steps or substances which make up the invention and which are specifically recited in the claims.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

Figure 1:
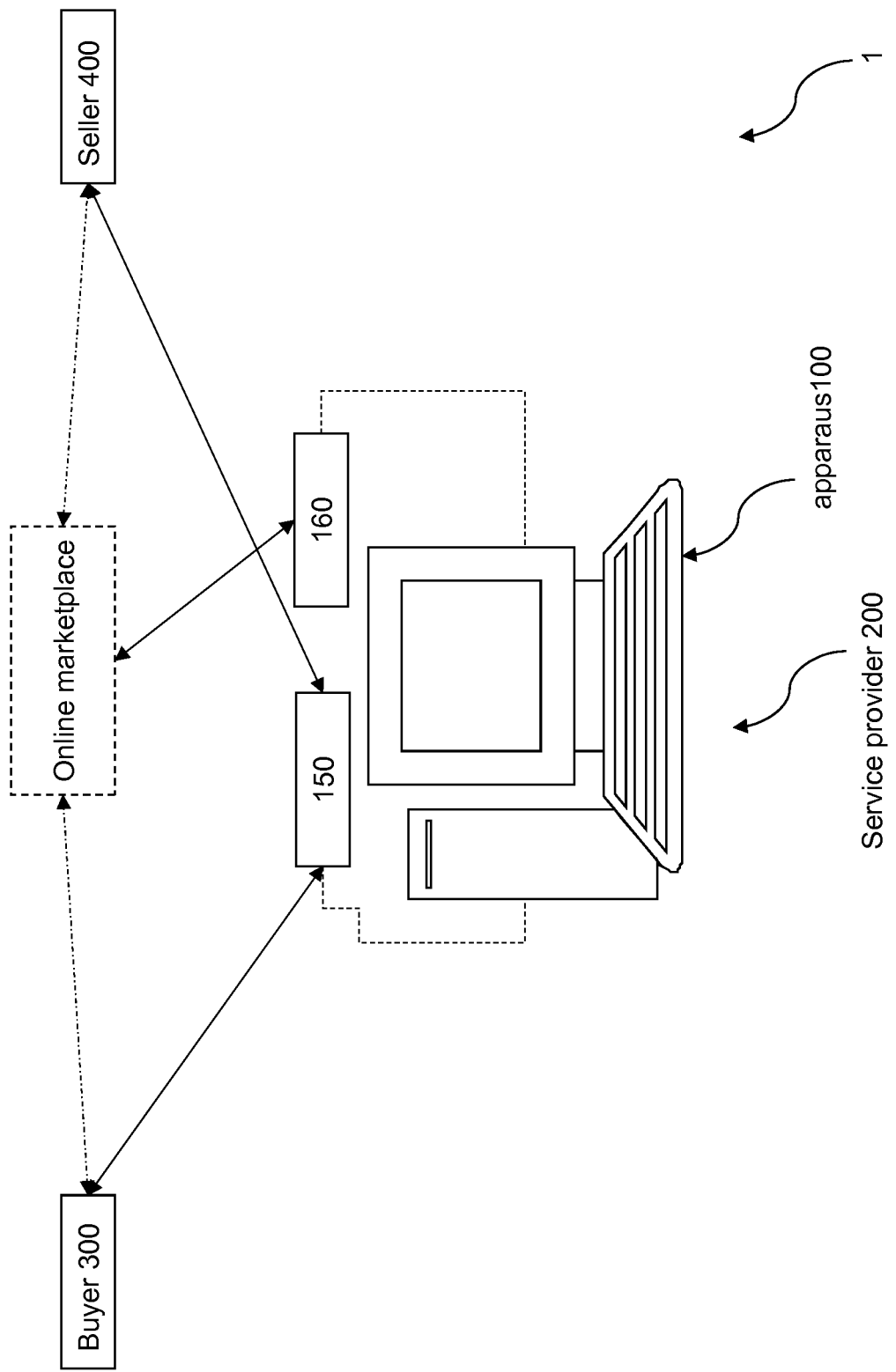
FIG. 1 shows a schematic diagram of a system for matching one or more buyers with one or more sellers to facilitate trade in a marketplace.

The foregoing describes only a preferred embodiment of the present invention and modifications, obvious to those skilled in the art, can be made thereto without departing from the scope of the present invention.

The present invention seeks to provide a secondary marketplace and connect buyers of mobile data with sellers of mobile data, in order to facilitate trade, or provide the public with a useful alternative. The present invention provides an apparatus and method for matching one or more buyers with one or more sellers to facilitate trade of mobile data in a marketplace (i.e. a secondary market) provided by the service provider.

In an embodiment the present invention relates to a computing apparatus for matching one or more buyers with one or more sellers to facilitate trade of mobile data in an online marketplace provided by a service provider, the apparatus comprising a processor, a user interface in electronic communication with the processor. The processor being configured to receive a bid to sell mobile data from one or more sellers via the user interface. The processor being configured to receive a bid to buy mobile data from one or more buyers via the user interface The processor configured to execute a matching operation to match at least a portion of the bid of the one or more buyers with at least a portion of the bid of the one or more sellers based on a revenue maximization function to maximize a service provider's revenue based on a relationship between administration revenue and bid revenue, and facilitating a transfer of mobile data from the one or more seller to the one or more buyers following the matching of the one or more sellers with the one or more buyers, through the service provider. In this embodiment the processor is further configured to determine an optimal buyer bid and determine an optimal seller bid. The user interface configured to provide the one or more buyers with the optimal buyer bid, and the user interface configured provide the one or more sellers with the optimal seller bid via the user interface.

The optimal seller bid is determined by solving one or more mathematical expressions. The processor is configured to or programmed to determine the optimal seller bid by determining a by determining a seller utility, a seller utility maximization that relates to the maximum amount of the seller is willing to sell as a function of a bid value. In this embodiment the optimal buyer bid is determined by solving one or more mathematical expressions. The processor is configured to or programmed to determine the optimal buyer bid by determining a buyer utility, buyer utility maximization that relates to the maximum amount of mobile data the buyer is willing to buy as a function of the bid value.

The processor is configured to determine a matching matrix that relates a percentage of a buyer bid that is satisfied by the seller bid, the processor further configured to select the revenue maximization function that maximizes the matching matrix in order to achieve optimal matching of the buyers and sellers.

In an embodiment the processor may comprise a non-transitory computer readable medium that can store instructions, to be executed by the processor to match buyers and sellers. The non-transitory computer readable medium is configured to store instructions and the mathematical expressions to determine an optimal seller bid, an optimal user bid and a matching matrix. The mathematical expressions can be stored as algorithms that can be executed by the processor.

The apparatus is a computer. The computer may be implemented by any computing architecture, including stand-alone PC, client/server architecture, "dumb" terminal/mainframe architecture, or any other appropriate architecture. The computing device is appropriately programmed to implement the invention.

In a further embodiment the present invention relates to a method for matching one or more buyers with one or more sellers to facilitate trade in an online marketplace provided by a service provider, the method comprising the steps of; receiving a bid to sell mobile data from one or more sellers, receiving a bid to buy mobile data from one or more buyers, matching at least a portion of the bid of the one or more buyers with at least a portion of the bid of the one or more sellers based on: a revenue maximization function to maximize the service provider's revenue based on a relationship between administration revenue and bid revenue, and facilitating a transfer of the mobile data from the one or more seller to the one or more buyer, following the matching of the one or more buyers with the one or more sellers, through the service provider.

In this embodiment the matching step comprises the additional steps of determining an optimal buyer bid, determining an optimal seller bid, providing the optimal buyer bid to the one or more buyers; and providing the optimal seller bid to the one or more buyer.

In an further embodiment the present invention relates to an apparatus for matching one or more buyers with one or more sellers to facilitate trade of mobile data in a marketplace provided by a service provider, the apparatus comprising a processor, a user interface in electronic communication with the processor, the processor being configured to receive a bid to sell mobile data from one or more sellers via the user interface, the processor being configured to receive a bid to buy mobile data from one or more buyers via the user interface, the processor configured to execute a matching operation to match at least a portion of the bid of the one or more buyers with at least a portion of the bid of the one or more sellers based on: the processor being arranged to determine an optimal buyer bid and the processor being arranged to determine an optimal seller bid, the processor configured to provide the optimal buyer bid and optimal seller bid to the buyer and seller respectively via the user interface, facilitating a transfer of mobile data from the one or more seller to the one or more buyers following the matching of the one or more sellers with the one or more buyers. In this embodiment the matching operation does not account for service provider revenue. The matching operation is configured to maximize buyer and seller utility.

An exemplary embodiment of the invention will now be described with respect to the figures.

Referring to FIG. 1 there is shown a schematic diagram of a system 1 for matching one or more buyers 300 with one or more sellers 400 to facilitate trade in a marketplace provided by a service provider 200. The service provider is an internet service provider (ISP) that provides mobile data to the buyers and sellers. The marketplace in this embodiment is an online, web based market place that connects sellers 400 and buyers 300. The marketplace is a secondary marketplace, with the service provider 200 hosting the marketplace. A secondary market place is a market, in which users trade assets directly with each other. In illustrate embodiment the buyers' 300 and sellers 400 trade mobile data, in particular surplus mobile data. The service provider 200 acts as the middleman and all transactions pass through the service provider 200, and the service provider 200 facilitates transfer of the mobile data from a seller 400 to a buyer 300 once a price is accepted by both the seller 400 and buyer 300. The marketplace is an online auction platform which allows buyers and sellers to bid, the bid including a buy/sell price for a specified amount of data for sale/or to be bought.

FIG. 1 shows the system comprises a computing apparatus 100 for matching one or more buyers with one or more sellers to facilitate trade in a market place. In this embodiment, the system comprises a computing apparatus 100 having suitable components necessary to receive, store and execute appropriate computer instructions.

Figure 2:
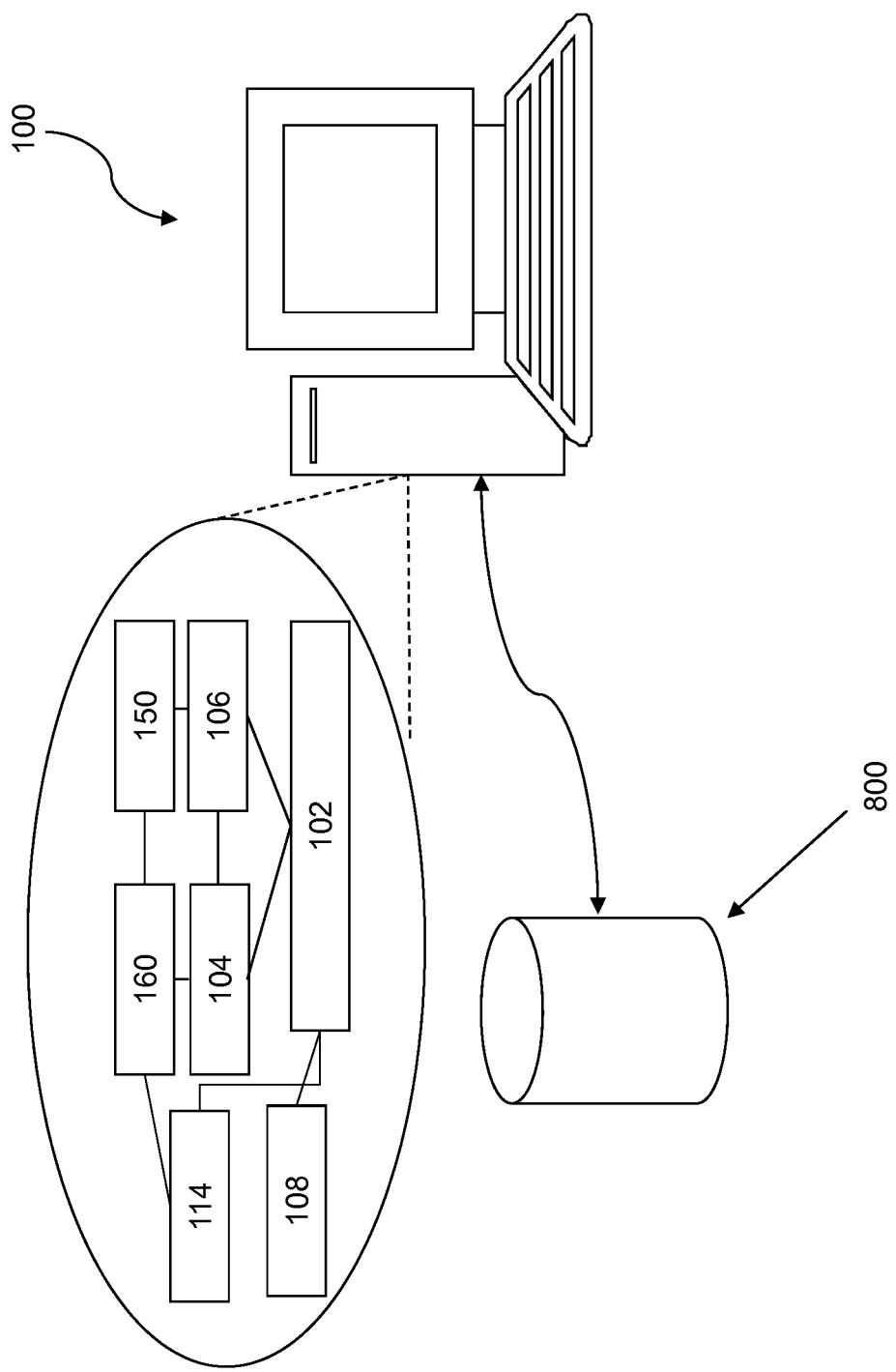
FIG. 2 shows a computing apparatus 100 for matching one or more buyers with one or more sellers to facilitate trade in a market place.

FIG. 2 shows a more detailed view of the apparatus 100, illustrating the components of the apparatus. The components may include a processing unit 102, read-only memory (ROM) 104, random access memory (RAM) 106, and input/output devices such as disk drives 108, input devices 110 such as an Ethernet port, a USB port, etc. Display 112 such as a liquid crystal display, a light emitting display or any other suitable display and communications links 114. The apparatus 100 includes instructions that may be stored in ROM 104, RAM 106 or disk drives 108 and may be executed by the processing unit 102.

There may be provided a plurality of communication links 114 which may variously connect to one or more computing or electronic devices such as servers, personal computers, terminals, wireless or handheld computing devices. At least one of a plurality of communications link may be connected to an external computing network through a telephone line or other type of communications link.

The apparatus 100 may include storage devices such as a disk drive 108 which may encompass solid state drives, hard disk drives, optical drives or magnetic tape drives. The apparatus 100 may use a single disk drive or multiple disk drives. The apparatus 100 may also have a suitable operating system 116 which resides on the disk drive or in the ROM of the apparatus 100.

The apparatus 100 further includes a user interface 150 and a web server 160. The web server 160 is configured to host the online marketplace. The marketplace is preferably an online auction site hosted by the service provider 200 (i.e. the ISP), and controller by the ISP.

The web server 160 is in electronic communication with the processor 102. The web server 160 can be a software program stored in ROM 104 or RAM 106 and executable by the processor 102. Alternatively the web server 160 can be a separate computing device that is in electronic communication with the apparatus 100 and processor 102, via the communications link 114. The user interface 150 is a web interface of the marketplace. In one example the web interface 150 is a website or webpage hosted by the web server 160. The user interface 150 allows buyers and sellers to communicate with the apparatus 100. The user interface 150 allows access to the online auction site (i.e. marketplace) that is being hosted by the computing apparatus 100, via web server 160, and allows buyers 300 and sellers 400 to view, submit and accept bids for mobile data.

In some embodiments the user interface 150 can be a mobile device such as a smartphone or a tablet or a mobile phone or a computer screen or a graphical user interface. In some embodiments the user interface 150 is a web interface that can be accessed by a web enabled user device such as a smart phone, mobile phone, laptop, tablet and the like. The user interface 150 allows the buyers and sellers to access information and communicate with the processor 102.

The buyers and sellers are preferably customers of the ISP 200, and hold mobile data accounts with the ISP. This account information can be stored in the storage device such as a disk drive 108 of the apparatus 100 or can be stored in a separate database 800 that is in electronic communication with the processor 102. The account information is updated as mobile data is traded between buyers and sellers following a matching process (described later). The ISP (i.e. service provider) can provide information regarding matching and data/money transfer to the buyers and sellers. In one example such information is provided as part of the buyer or seller bills.

The processor 102 configured to receive a bid to sell mobile data from one or more sellers via the user interface 150 and the processor 102 being configured to receive a bid to buy mobile data from one or more buyers via the user interface. A bid relates to a price and an amount of data associated with that price, the buyer bid relating to a price the buyer is willing to pay for an amount of mobile data and the seller bid relating to the price the seller is wants to receive for an amount of mobile data.

The processor 102 is arranged to determining an optimal buyer bid, and determine an optimal seller bid. The processor 102 is further arranged to provide the optimal buyer bid to a buyer through the user interface, and provide the optimal seller bid to the seller.

The processor 102 is arranged to determine an optimal seller bid by determining a seller utility and a seller utility maximization that relates to the maximum amount of data a seller is willing to sell as a function of the bid value. The processor 102 is arranged to determine the optimal buyer bid by determining the buyer utility and a buyer utility maximization that relates to the maximum amount of data a buyer is willing to buy as a function of the bid value.

The processor 102 is then arranged to match a portion of the bid of the one or more buyers 300 with a portion of the bid of the one or more sellers 400. Preferably the entire bid of the seller 400 is matched to the entire bid of the buyer 300, but the processor 102 attempts to match bids as closely as possible. The processor 102 is further arranged to match the bids based on a revenue maximizing function to maximize the service provider's revenue based on relationship between an administration fee and a bid revenue. The service provider charges an administration fee for every successful matching and trade of mobile data, and is proportional to the amount of mobile data traded. A bid revenue is the value difference between the seller price and buyer price. The matching is done in a way to ensure that a higher buyer price is matched with a lower seller price to create a greater bid revenue. This difference is pocketed by the service provider. The matching is performed to maximize the revenue from both the administration revenue and bid revenue.

As part of the matching process, the processor 102 is arranged to provide optimal bid values to the buyers 300 and sellers 400. Once matched the buyer 300 and seller 400 accept the bids, and mobile data trade is facilitated by the processor 102. The processor 102 is configured to transfer the amount of data agreed on as part of the bid from the seller 400 (i.e. a seller mobile data account with the ISP 200) to the buyer (i.e. into a buyer mobile data account with the ISP 200). The matching process and optimal bid calculation process is repeated by the processor a number of times to match as many buyers with as many sellers. In an example the description above of matching buyers and sellers is repeated by the apparatus multiple times a month.

In an embodiment the processor 102 is configured to match the seller bid with a buyer bid i.e. to connect a buyer 300 with a seller 400. The processor 102 can automatically accept the seller bid and buyer that best match based on the matching process (described later). The processor 102 can automatically transfer data from the seller to the buyer, and transfer money from the buyer to the seller.

In an alternative embodiment the processor 102 is configured to present a seller 400 with one or more buyer bids, preferably a plurality of buyer bids, which best match the seller via the user interface 150. The seller 400 can select the buyer bid that the seller feels most comfortable with and provide this information to the processor via the user interface. Once the seller 400 selects a buyer bid, the processor facilitates trade of data from the seller to the buyer and transfer of funds or money from the buyer to the seller.

In a further alternative embodiment the processor 102 is configured to further provide the buyer 300 with one or more seller bids, in addition to presenting the seller 400 with one or more buyer bids. The buyer and seller can select the respective bids they each prefer and provide the selected bid information to the processor 102 via the user interface 150. The processor 102 is configured to facilitate transfer of data and money between buyers and sellers based on the selections made by the buyer and seller. Such an embodiment can be advantageous because buyers and sellers have control regarding which offer is selected.

Utility as used in this specification relates to the economic definition of utility i.e. utility defines the total satisfaction received from consuming a good or service. Buyer utility defines the total satisfaction received from buying an amount of mobile data for a particular buying price. Seller utility defines the total satisfaction received from selling an amount of mobile data for a particular selling price. Utility maximization relates to when making a purchase or sale decision, a consumer attempts to get the greatest possible value possible from expenditure of least amount of money. Seller utility maximization relates to the concept of the seller attempting to gain maximum amount of money from the sale of a minimum amount of mobile data. Buyer utility maximization relates to the concept of the buyer attempting to gain the maximum amount of mobile data for the minimum amount of money.

Below is an explanation of the mathematical models the apparatus 100 and processor 102 utilizes in order to match one or more buyers 300 with one or more sellers 400 to facilitate trade in a marketplace, which can be an online marketplace as described earlier.

The following is an explanation of how to determine buyer and seller utility maximization. Different users can purchase different data caps from their ISPs. A buyer l and seller j's data caps before trading are denoted as dbl and dsj respectively. Each buyer and seller has a maximum amount of leftover data, denoted as obl and osj thus, each user consumes at least dbl−obl (buyers) or dsj−osj (sellers) amount of data. For instance, users will likely have some predictable usage over a month, e.g., for habitual browsing and checking email. Note that this leftover data must be less than the data cap: obl≤dbl and osj≤dsj. A buyer l's bid is defined by an amount of data bl and a price πl that he/she is willing to pay. Similarly, each seller j bids a price σj for an amount of data sj.

Figure 3:
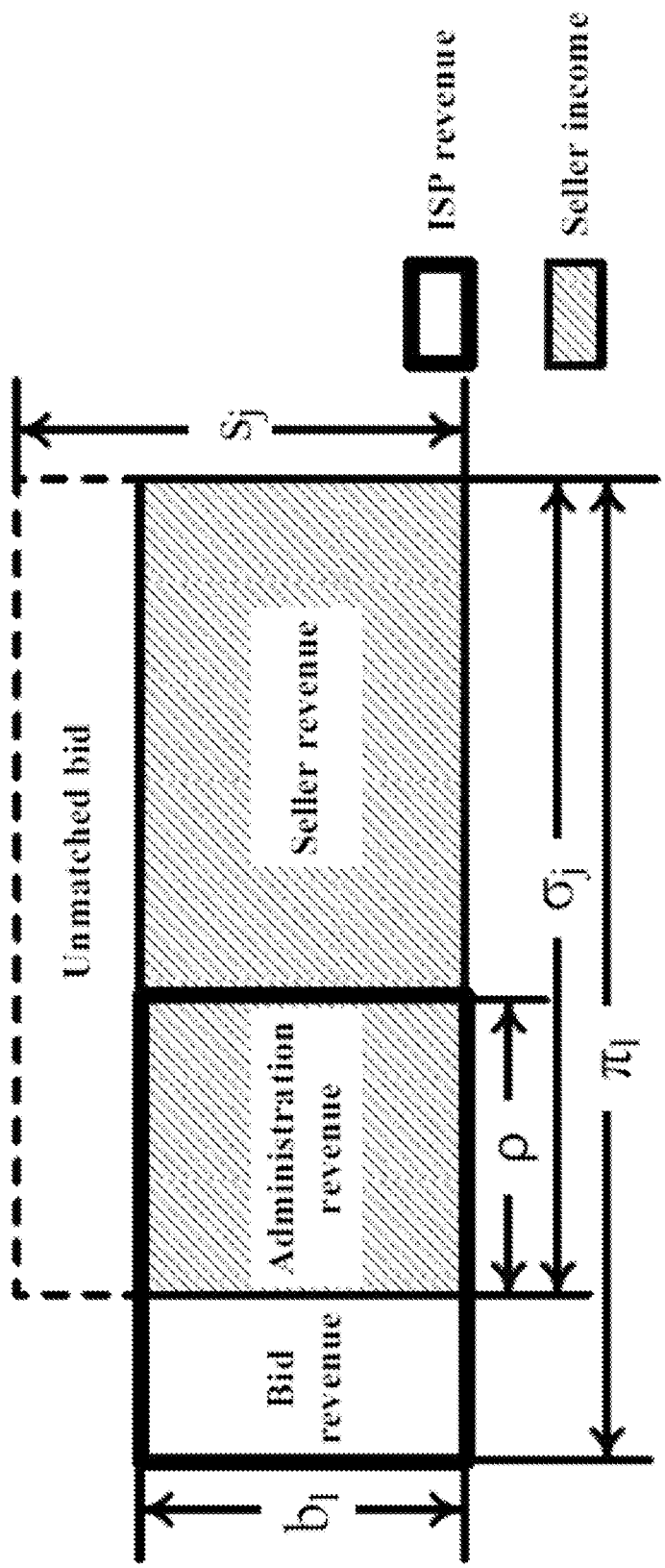
FIG. 3 shows how a service provider (i.e. ISP) provides matching of a buyer to a seller.

FIG. 3 shows how buyers' bids are matched to sellers' bids and how the ISP receives revenue in the marketplace. The buyer purchases her entire bid i.e. the entire amount of data required. The seller's income is split between the administration revenue paid to the ISP and the revenue kept by the seller. The ISP further receives a bid revenue from the difference between buyer and seller prices. The bid prices lower limit is set by an administration fee ρ per unit data sold that the ISP imposes on the sellers, since the ISP provides a platform to sell mobile data. Sellers will not accept a buyer l's price πl<p, since πl does not cover the administration fee and the seller loses money. The prices have an upper bound that is dictated by the ISP's overage fee p per unit data: buyers prefer to buy data from the ISP at price p rather than accept seller j's price if σj>p.

Absent the cost or revenue from trading data, users gain utility from consuming data. A α-fair utility function is used to model the usage utility from consuming c amount of data:

$$V(c) = \frac{\theta c^{1-\alpha}}{1-\alpha}, \tag{1}$$

where θ is a positive constant representing the scale of the usage utility and it is assumed that α∈[0, 1) $(\theta_j^s, \alpha_j^s)$ is used to denote the parameters for seller j and $(\theta_l^b, \alpha_l^b)$ for buyer l. The above is the expression used to define utility in general.

Figure 4:
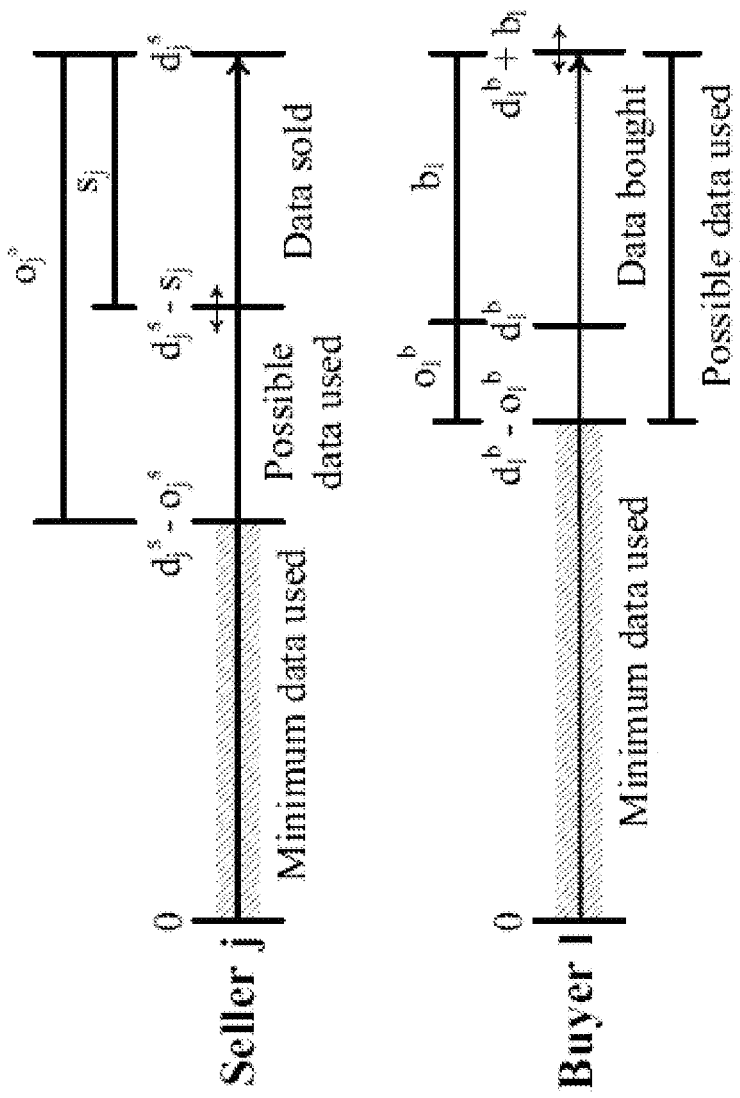
FIG. 4 shows relationships between a data cap, leftover data and data bought/sold for sellers and buyers.

An exemplary embodiment of determining the optimal seller bid will now be described. It is understood that sellers can submit bids before the end of the month. In these situations sellers do not exactly know or cannot anticipate their future usage. In this example it is assumed that each seller j's realized usage csj for the month is a random variable with distribution f. This distribution depends not only on the amount of data sold sj, but also on the user's maximum leftover data osj and data cap before trading dsj. FIG. 4 shows a relationship between data cap, leftover data and data sold for a seller. As per FIG. 4, the seller consumes at least dsj−osj amount of data, i.e. his minimum usage, and at most dsj−sj amount of data, i.e., the data cap after selling data. The jth seller's expected usage utility from selling sj amount of data is then expressed as $$\int_{d_j^s - o_j^s}^{d_j^o - s_j} V_j^s(c_j^s) \bar{f}(c_j^s) dc_j^s.$$

The seller's revenue term equals (σj−ρ)sj as per FIG. 3. The utility of the jth seller when selling sj data is determined by the following expression:

$$E(U_j^s \mid s_j) \int_{d_j^s - o_j^s}^{d_j^o - s_j} V_j^s(c_j^s) f(c_j^s) dc_j^s + (\sigma_j - \rho) s_j. \quad (2)$$

The expression (2) is always increasing in the seller price $\sigma_j$. Thus in general sellers always bid higher prices, subject to their ability to be matched to buyers (this will be explained later). Since σj and the distribution f, the seller chooses $s\_j(\sigma_j) \in [0, osj]$ so as to maximize the utility (as defined by expression 2). Though it is possible that the seller will not be able to sell all of his data, it is still optimal for the seller to bid the utility-maximizing $s^*_j$. If the expression $E(U_j^s \mid s_j)$ is a concave shaped curve then $E(U_j^s \mid s_j)$ is increasing in sj for the condition $s_j \in [0, s^*_j]$. The seller always bids the maximum amount of data up to the optimum amount $s^*_j$.

Some example distributions of seller utility $E(U_j^s \mid s_j)$ will now be described and the optimal seller utility expression will be shown as being satisfied by the optimal seller bid. Some sellers may only use the minimum data (i.e. f is a delta distribution centered at dsj−osj). In this case, $E(U_j^s \mid s_j)$ is linear in sj and the seller bids $s^*_j = \sigma_j^s$ amount of data. Other sellers may use up their entire data caps in the month. In this case the function (2) can be re-written as:

$$E_\delta(U_j^s \mid s_j) = V_j^s(d_j^s - s_j) + (\sigma_j - \rho) s_j. \quad (3)$$

This the optimal bid $s^*_j$ can be determined as max{0, min{$o_j^s, d_j^s - ((\sigma_j - \rho)/\theta_j^s)^{-1/\alpha_j^s}$}}. Generally the seller's usage will fall somewhere between the two extremes defined above. For this embodiment it is assumed that the distribution of data amount to be sold follows a uniform distribution $f(c_j^s) = (\sigma_j^s - s_j)^{-1}$ between $d_j^s - \sigma_j^s$ and $d_j^s - s_j$. The utility function of the seller is assumed to follow a concave shape. The optimal seller bid satisfies the seller utility function, in order to determine seller utility. The function below is used to determine seller utility:

$$(o_j^s - s_j^\star)(\sigma_J - \rho) = V_j^s(d_j^s - s_j^\star) - \int_{d_j^s - o_j^s}^{d_j^s - s_j^\star} V_j^s(c_j^s) f(c_j^s) dc_j^s \quad (4)$$

The function above for seller utility models various behavior of multiple sellers. The function accounts for their effect the seller future usage, and different usage habits.

The seller's utility maximization is determined by using the following expression:
Initialize $s(o) \in (0, o^s)$.

1) The jth seller updates the data caps to be sold:

$$s_j(k+1) = o_j^s - \frac{1}{\sigma_j - \rho} V_j^s(d_j^s - s_j(k)) + \frac{1}{\sigma_j - \rho} \int_{d_j^s - o_j^s}^{d_j^s - s_j(k)} V_j^s(c_j^s) f(c_j^s) dc_j^s.$$

2) Normalize $s_j(k+1)$:

$$s_j(k+1) \leftarrow \min\left\{s_j(k+1), d_j^s - \left(\frac{\theta_j^s(d_j^s + \alpha_j^s) o_j^s}{2 d_j^s \pi_l (\sigma - \rho)}\right)^{\frac{1}{\alpha_j^s}}\right\} \quad (5)$$

The utility maximization expression is used to determine an amount of data a seller should sell at a specific price to achieve maximum utility. The utility maximization expression is used to determine the optimal seller bid value.

Turning now to the buyer, the following is an explanation about how to determine optimal buyer bid and a buyer utility maximization. Like sellers buyers too do not exactly know their future usage. The buyer's monthly usage $c_l^b$ is taken to be a random variable with a distribution $f(c_l^b)$ between the minimum usage $d_l^b - c_l^b$ and the data cap after trading $d_l^b + b_l$, as per FIG. 4. Hence the expected data usage utility of the lth buyer purchasing bl amount of data is given by $$\int_{d_l^b - o_l^b}^{d_l^b + b_l} V_l^b(c_l^b) f(c_l^b) dc_l^b.$$

Each buyer l's cost of purchasing bl amount of data is blπl, so the expected utility of the lth buyer is determined by using the function:

$$E(U_l^b \mid b_l) \int_{d_j^b - o_j^b}^{d_l^b + b_l} V_l^b(c_l^b) f(c_l^b) dc_l^b - b_l \pi_l. \quad (5)$$

Since the function (5) is decreasing in πl, it can be taken to show that buyers wish to bid at lower prices, subject to their ability to be matched to sellers. As explained with sellers, some buyers will only use their minimum data usage $d_l^b - o_l^b$, and these buyers will therefore not purchase any data in the market. Other buyers will use up their entire data cap, i.e., their distribution f will be the delta distribution centered at $d_l^b + b_l$. The utility function under this distribution is given by:

$$E_\delta(U_l^b \mid b_l) = V_l^b(d_l^b - b_l) - \pi_l b_l \quad (6)$$

The optimal bid data is determined by $b_l^*(\pi_l) = (\pi_l / \theta_l^b)^{-1/\alpha_l^b}$. In most cases the buyer's usage will lie between the two extremes similar to the seller situation described earlier. It is assumed that the distribution f is the uniform distribution $f(c_l^b) = 1/(\sigma_l^b + b_l)$. The utility function of the buyer is assumed to follow a concave shape. The optimal buyer bid satisfies the buyer utility function, in order to determine buyer utility. The function below is used to determine buyer utility:

$$(o_l^b + b_l^\star) \pi_l = V_l^b(d_l^b + b_l^\star) - \int_{d_l^b - o_l^b}^{d_l^b + b_l^\star} V_l^b(c_l^b) f(c_l^b) dc_l^b \quad (7)$$

The optimal buyer bid satisfies the expression above. The function above for buyer utility models various behavior of multiple buyers. The function accounts for their effect the buyer future usage, and different usage habits.

The buyers utility maximization is determined by the following expression:

Initialize $b(0) \in \mathbb{R}_+^L$.

1) The lth buyer updates the amount of data to be purchased:

$$b_l(k+1) = \frac{1}{\pi_l} V_l^b(d_l^b + b_l(k)) - \frac{1}{\pi_l} \int_{d_l^b - o_l^b}^{d_l^b + b_l(k)} V_l^b(c_l^b) f(c_l^b) dc_l^b - o_l^b.$$

2) Normalize $b_l(k+1)$:

$$b_l(k+1) \leftarrow \min\left\{ b_l(k+1), \left( \frac{\theta_l^b (d_l^b + \alpha_l^b \ o_l^b)}{2 d_l^b \pi_l} \right)^{\frac{1}{\alpha_l^b}} - d_l^b \right\}. \quad (8)$$

Users choose to be a buyer 300 or a seller 400 based on the utility they can achieve from buying or selling data. The following is an example of how to determine whether a user will get maximum utility by being a seller or a buyer. The following expression can be used to determine if the user will be a buyer or seller $E(U^*_j | s^*_j(p)) \geq E(U_l^b | b^*_l(\rho))(A)$, the user becomes a seller. The user's maximum utility from selling data (assuming all data is sold at the maximum price) must be higher than the maximum utility from purchasing data (assuming all data is bought at the minimum price). If (A) is reversed, the user buys data.

To illustrate this decision, it is assumed that the user's usage follows the delta distribution, as described earlier for the buyer and seller examples. A derivation of following condition on users' utility scaling factor θ in in the general usage utility function (1). The user will sell data when the scale θ satisfies $\theta \leq \hat{\theta}$ and buys data when $\theta \geq \hat{\theta}$, where:

$$\hat{\theta} = \left( \left( \frac{1-\alpha}{\alpha} \right) \left( \frac{(p-\rho)d_j^a - \rho d_l^b}{\rho^{\frac{\alpha-1}{\alpha}} - (p-\rho)^{\frac{\alpha-1}{\alpha}}} \right) \right)^\alpha \quad (9)$$

Based on expression (9) users with high utility scaling θ become buyers, while those with low θ become sellers.

The service provider (i.e. ISP) 200 will match buyers 300 and sellers 400 so as to optimize its revenue. The revenue is maximized by using a revenue maximization function. The optimal matching of buyers 300 and sellers 400, to maximize the ISP's revenue, will not be described.

The ISP 200 will often encounter sellers' and buyers' bids that are not exactly aligned: for instance, if a seller offers more data than any single buyer is willing to purchase. To help match such bids, it is assumed that the ISP 200 can match multiple buyers to multiple sellers. Since the ISP 200 acts as a middleman between all buyers and all sellers, an optimal matching can be determined by the ISP 200. This matching, in some embodiments, can be transparent to users (i.e. buyers 300 and sellers 400). All required accounting can be done internally by the ISP 200.

The matching between buyers and sellers is defined by a matching matrix $\Omega = [\Omega_{l,j}]_{l,j=1}^{L,J} \geq \bar{0}$. Each (l, j) entry of Ω represents the percentage of the lth buyer's demand (i.e., amount of data bid) bl that is satisfied by the jth seller's data supply sj; thus $\Omega_{lj} b_l$ represents the amount of data that buyer l purchases from seller j.

The ISP 200 matching is primarily constrained by the buyer and seller bids. Buyer l's bid of a price πl and amount of data bl constrains the ISP matching in two ways: first, the buyer will buy at most bl amount of data, leading to the feasible set:

$$B = \left\{ \Omega \,\middle|\, \sum_{j=1}^{J} \Omega_{lj} \leq 1, l = 1, \ldots, L \right\}. \quad (10)$$

It is assumed that the buyer 300 will accept matchings in which his/her bid is only partially matched. The buyer's price πl gives an upper bound to the average purchase price of her data. It is assumed that the buyer 300 will pay this bid price πl for all data purchased; the amount paid is defined by, $\pi_l \Sigma_j \Omega_{lj} b_l$, must be must be at least as much as the data cost specified by sellers' bid prices (i.e., a cost σjΩljbl for each seller j). Mathematically, a feasible set is defined as:

$$\Pi = \left\{ \Omega \,\middle|\, \sum_{j=1}^{J} \Omega_{lj} \sigma_j \leq \pi_l \sum_{j=1}^{J} \Omega_{lj}, l = 1, \ldots, L \right\}. \quad (11)$$

If the total amount paid by the buyer exceeds the data cost, the ISP keeps the excess as part of its bid revenue. Similarly, seller j's bid of a price σj and amount of data sj implies that the seller will sell at most sj amount of data. This is defined by:

$$S = \left\{ |\Omega| \sum_{l=1}^{L} \Omega_{lj} b_l \leq s_j, j = 1, \ldots, J \right\}. \quad (12)$$

The total amount of money paid by all buyers for seller j's data $\Sigma_l \Omega_{lj} b_l \pi_l$ must be at least the cost of the data $\sigma_j \Sigma_l \Omega_{lj} b_l$. The total amount for all buyers and sellers is defined as:

$$\sum = \left\{ \Omega \,\middle|\, \pi_l \sum_{l=1}^{L} \Omega_{lj} b_l \leq \sigma_j \sum_{l=1}^{L} \Omega_{lj} b_l, j = 1, \ldots, J \right\}. \quad (13)$$

The ISP 200 must choose a matching matrix that satisfies the following mathematical relationship $\Omega \in B \cap \Pi \cap S \cap \Sigma$, wherein each of the variables has been defined above as (10)-(13). The matching matrix is selected to maximize the revenue of the ISP.

The ISP revenue is gained from two sources, the administrative fee and the bid revenue. The ISP's revenue from the administrative fee is proportional to the volume of data traded in the marketplace. This is mathematically defined as $\rho \Sigma_{l,j} \Omega_{lj} b_l$. In an alternative exemplary embodiment the administration fee can be proportional to the number of matched bids. To determine the bid revenue, the differences between each buyer's payment and each seller's income is determined. This difference is retained by the ISP as a bid revenue on each bid there is a difference. The mathematical definition of bid revenue is $\Sigma_l(\pi_l \Sigma_j \Omega_{lj} b_l - \Sigma_j \sigma_j \Omega_{lj} b_l)$. As per expression (11), this difference is always positive, ensuring that the ISP receives a bid revenue on each transaction.

The ISP revenue maximization function is as defined below. The ISP revenue is maximized by solving the linear program (i.e. the revenue maximization function), and the optimal solution to the linear program is an optimal matching matrix function denoted by $\Omega^*$ $$\underset{\Omega}{\text{maximize}}\ \omega\rho\sum_{j=1}^{J}\sum_{l=1}^{L}\Omega_{lj}b_l + (1-\omega)\sum_{l=1}^{L}\sum_{j=1}^{J}(\Omega_{lj}b_l\pi_l - \Omega_{lj}b_l\sigma_j) \quad (14)$$

subject to $$\Omega \in B \cap S \cap \Pi \cap \sum; \Omega \geq 0.$$

The parameter $\omega$ trades off between administration revenue and bid revenue. This parameter and its effect will now be discussed in more detail. In this embodiment if the seller 400 bids greater than the optimal selling bid i.e. $s_j > s^*_j$, it does not improve the seller's chance of matching, i.e. does not improve the seller's bid from being optimally matched. Therefore the optimal matching matrix is derived for an optimal seller bid, $s^*_j$, as the optimal seller bid goes to maximize revenue for the ISP 200. The same logic applies to the buyer, i.e. the buyer chance of being matched is not increased if the buyer bids greater than the optimal buyer bid $b^*_l$.

In one example the ISP 200 can maximize its total revenue by selecting $\omega=0.5$, i.e., weighting the bid and administration revenue equally. However, while both types of revenue generally increase with the amount of data traded, changing $\omega$ can lead to different matching outcomes. The ISP can thus incorporate other considerations into its matching objective.

In one example if $\omega<0.5$, i.e., preferentially weighting the bid revenue, is equivalent to reducing the administration fee $\rho$. For instance, if it is assumed that the ISP 200 incurs a constant marginal cost of supporting $\Sigma_{l,j}\Omega_{lj}b_l$ amount of traffic on its network, the ISP 200 can subtract this cost from the administration fee. This allows the ISP 200 to maximize its profit instead of the revenue.

Figure 5:
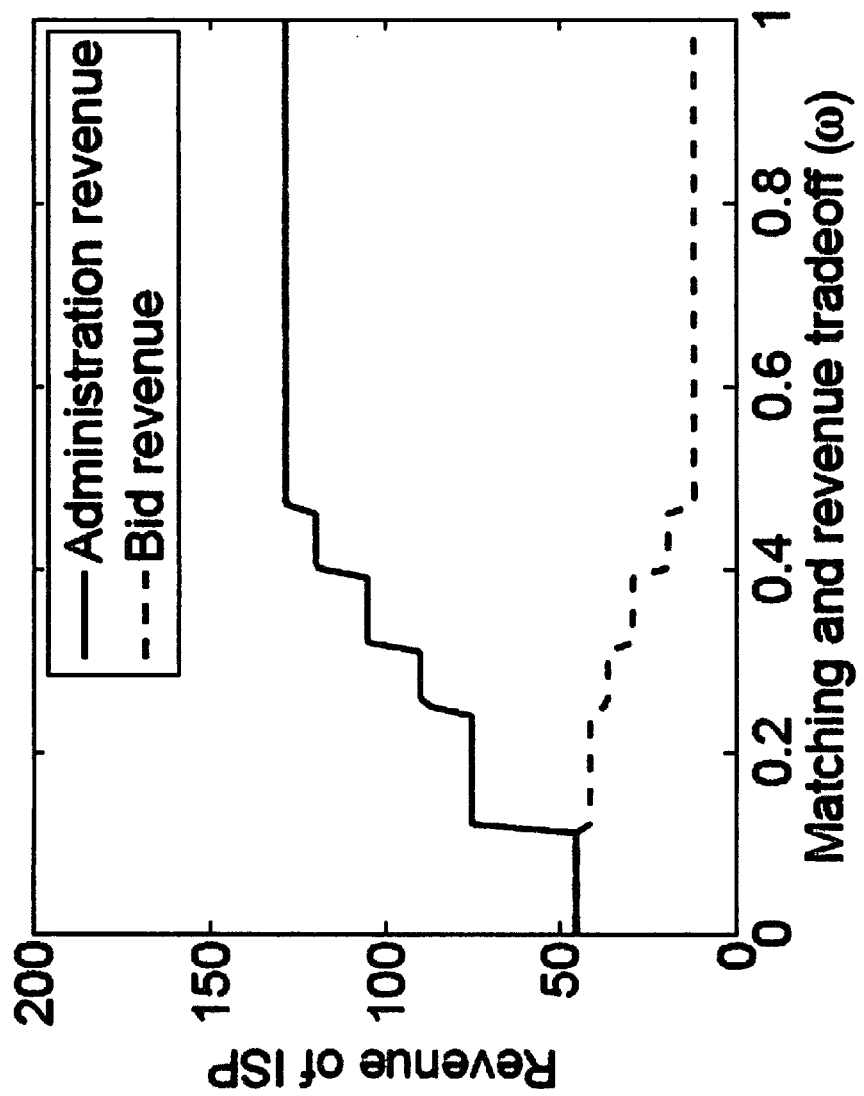
FIG. 5 shows a relationship between administration revenue and bid revenue as a function of the variable w; and, FIG. 6 shows a flowchart illustrating an example of a method for matching one or more buyers with one or more sellers to facilitate trade in a marketplace provided by a service provider.

In another example when the ISP preferentially weights its bid revenue, the ISP attempts to match buyers with high prices to sellers with low prices. This is done to increase the difference in the amount paid by buyers and sellers. In contrast, when maximizing its administration revenue, the ISP wishes to maximize the total amount of data traded. Hence, for higher $\omega$ (i.e., preferential weight to administration revenue) the ISP is configured to match a seller to buyers with both higher and lower prices. This will lead to buyers' prices $\pi l$ to then average out to equal the seller's price $\sigma j$, and the seller would be able to trade more data than if he had only been matched to buyers with higher $\pi l$. A necessary condition on $\omega$, under which such matchings occur, can be derived using the following expression:

$$\text{If } \pi_l < \sigma_j \text{ and} \quad (15)$$

$$w < \frac{\max_j \sigma_j - \min_l \pi_l}{\rho + (\max_j \sigma_j - \min_l \pi_l)}$$

then the ISP 200 will not match buyer l with seller j. If $\omega=1$, then $\omega$ never satisfies expression (15). If $\omega=1$, then low price buyers can be matched with sellers having higher prices. FIG. 5 illustrates the effect of varying $\omega$ and also shows the outcomes of five users.

As seen from FIG. 5, when the ISP 200 preferentially weights bid revenue, i.e. if $\omega$ is small, the seller with the lowest price (Seller 1) and the buyer with highest price (Buyer 3) are the only users matched. However, as $\omega$ increases, more users are matched; in fact, for $\omega>0.44$, buyers 1 and 4 both purchase data, even though their bid prices are lower than all the sellers' bid prices. Furthermore, as $\omega$ increases, the administration revenue $\rho\Sigma_i\Sigma_j\Omega_{ij}b_l$ increases, but the bid revenue $\Sigma_i\Sigma_j(\Omega_{ij}b_l\pi_i-\Omega_{ij}b_l\sigma_j)$ decreases. Even for $\omega=1$, some buyers and sellers may not be matched. In this embodiment buyers and sellers compete with one another on the basis of price. Buyers 300 paying higher prices and sellers 400 accepting lower prices thus have the opportunity to trade some data.

In an alternative embodiment $\omega=1$ to maximize administration revenue. Administration revenue is proportional to the total amount of data traded among buyers and sellers. In an example if $\omega=1$, then low price buyers can be matched with sellers having higher prices. In this embodiment setting $\omega=1$ can assist in maximizing the total amount of data traded, because there is a higher number of matchings that occur. The ISP and in particular the processor can be configured to set the weighting parameter to 1 in order to create an increased number of matches, in order to maximize administration revenue. The value of the weighting parameter can be modified by the ISP (i.e. service provider) at any time in order to best suit its business model and goal.

In a further alternative embodiment $\omega$ (the weighting parameter) can be set to 0 such that the matching function does not account for a service provider revenue. In this alternative embodiment the matching function does not include a service provider revenue. This allows for a free secondary market for mobile data trade to be established. The seller or buyer is not charged an administration fee nor is a bid revenue generated. The ISP can set the weighting parameter to 0 in order to promote the secondary data trading service offered by the ISP. This can be advantageous as an increased amount users can be encouraged to sign up to the ISP in order to use the secondary market services, thus increasing the total number of potential customers for primary services offered by the ISP.

The system 1 and apparatus 100 are arranged such that buyers 300 and sellers 400 can submit new bids at any time. The apparatus (i.e. the ISP 200) is arranged to run multiple matchings per month. As such, the number of matchings can vary from month to month depending on how frequently users submit bids. Moreover, buyers and sellers can "actively learn" from each matching outcome: for instance, if a seller is not matched to any buyer, this seller can lower price in the next bid to attract buyers. The apparatus is configured to allow buyers and sellers to actively learn since the apparatus 100 provides suggested optimal bids for buyers and sellers.

In one example optimistic buyers (resp. sellers) might choose their initial prices $\pi l(0)=\rho$ or $\sigma j(0)=p$, though buyers and sellers would likely have to raise and lower prices respectively before they could be matched. Risk-averse sellers and buyers, on the other hand, would respectively abide by the minimum and maximum prices to ensure that they will be matched. Other users would leverage their past experience.

The apparatus 100 comprises a set of instructions stored in a non transitory computer readable medium, such as a memory unit. The instructions can be executable by the processor 102. The mathematical expressions described above are stored as executable instructions in memory. The processor 102 is configured to execute the instructions, in use to determine the various parameters from the expressions provided above. It should also be noted that at least some of the expressions above are illustrative to show how the executable expressions are determined. In this embodiment at least the numbered expressions are executed, in use, by the processor 102.

In this embodiment the processor 102 is further arranged to execute a set of instructions which are stored as an algorithm, the algorithm is shown below:

At $k = 0$, the jth seller initializes $\sigma_j(0)$ and $s_j^*(\sigma_j(0))$, and the (16)
lth buyer initializes $\pi_l(0)$ and $b_l^*(\pi_l(0))$.
while $L(k) > 0$ and $J(k) > 0$ do
  1) Upon receiving bids $(b_l(k),\pi_l(k))$ and $(s_j(k), \sigma_j(k))$ from $L(k)$ buyers and $J(k)$ sellers, the ISP updates the constraint sets $B \equiv B(k), \Pi \equiv \Pi(k), S \equiv S(k)$ and $\Sigma \equiv \Sigma(k)$.
  2) The ISP computes $\Omega(k + 1)$ by solving (14) with $L(k),J(k),s_j(k),\sigma_j(k),b_l(k),\pi_l(k)$ as $L,J,s_j,\sigma_j,b_l,\pi_l$.
  3) Each seller j updates the bid price and amount of data:
    if $\Sigma_l \Omega_{ij}(k + 1) b_l(k) < s_j(k)$ then
      $d_j^s(k + 1) \leftarrow d_j^s(k) - \Sigma_l \Omega_{ij}(k + 1) b_l (k)$
      $o_j^s(k + 1) \leftarrow o_j^s(k) - \Sigma_l \Omega_{ij}(k + 1) b_l (k)$
      $\sigma_j(k + 1) \leftarrow \max\{\sigma_j(k) - \in_j^s(k), p\}$,
      Run Algorithm 1 to obtain $s_j(k + 1)$.
    end if
  $J(k +1) \leftarrow J(k)$.
  if $\Sigma_l \Omega_{ij}(K + 1) b_l (k) = s_j(k)$ then
    Transaction is successful: $J (k + 1) \leftarrow J(k + 1) - 1$.
  end if
  4) Each player l updates the bid price and amount of data:
    if $\Sigma_j\, bl(k) \Omega_{ij}(K + 1) < b_l(k)$ then
      $d_l^b(k + 1) \leftarrow d_l^b(k) + \Sigma_j b_l(k) \Omega_{ij}(k + 1)$,
      $o_l^b(k + 1) \leftarrow o_l^b(k) + \Sigma_j b_l(k) \Omega_{ij}(k + 1)$,
      $\pi l(k + 1) \leftarrow \min\{\pi l(k) + \in_l^b(k), p\}$
      Run Algorithm 2 to obtain $b_l(k + 1)$.
    end if
  $L (k + 1) \leftarrow L (k)$.
  if $\Sigma_j\, bl(k) \Omega_{ij}(K + 1) = b_l(k)$ then
    Transaction is successful: $L (k + 1) \leftarrow L (k + 1) - 1$.
  end if
  5) New sellers and buyers submit bids to the ISP.
  A new seller submits bid: $J (k + 1) \leftarrow J (k + 1) + 1$,
  A new seller submits bid: $L (k + 1) \leftarrow L (k + 1) + 1$.
  6) $k \leftarrow k + 1$.
end while The algorithm (16) is a set of instructions that defines the trading dynamics of the marketplace. Trading dynamics comprises determining the value of bids being supplied by one or more buyers and the value of one or more bids supplied by one or more sellers, and determining a number of matchings of buyers to sellers in order to facilitate trade of mobile data.

The algorithm (16) in this embodiment defines operation of the apparatus 100 as the algorithm steps are executed by the processor 102. The algorithm 15 begins by receiving initial bids by sellers and buyers. It should be noted the optimal selling bid and optimal buying bid has been provided by the processor 102 to the buyer and seller respectively. Upon receiving the bids, the processor 102 is configured to update the constraint sets $B \equiv B(k)$, $\Pi \equiv \Pi(k), S \equiv S(k)$ and $\Sigma \equiv \Sigma(k)$. The constraint sets are defined as executable instructions stored in memory. The processor 102 is configured to compute an optimal matching matrix by solving expression 13. The processor 102 is then configured to provide matching information to at least the seller, i.e. provide an optimal bid to the seller. The processor 102 receives an updated seller bid, and the processor 102 is configured to check a matching. If there is a match between a seller and buyer bid, then the algorithm moves back to the start for another bid from a seller. If no matching occurs, the processor 102 is configured to receive an updated buyer bid. The algorithm ends if there is match between a buyer and seller after an updated buyer bid is received. The buyers and sellers can respond to receiving optimal bids, by amending their respective bids. The processor 102 re-computes the amount of data to bid with the new prices, and re-computes a matching matrix, as per the algorithm to try and match buyers and sellers with the new bids. The processor 102 is arranged to repeat this process until all or at least a substantial amount of buyers and sellers are matched to facilitate mobile data trade. The processor 102 is configured to transfer the mobile data from the seller to the buyer and update their respective accounts.

The mathematical expressions and functions described above are stored as a set of executable instructions in a non-transitory computer readable medium. In this embodiment the mathematical expressions are stored as executable instructions in the disk drive 108 or a data base that is in electronic communication with the processor 102. The processor 102 is arranged to execute the various mathematical expressions described above as part of the matching the buyers 300 with sellers 400 to facilitate transfer of mobile data. The expressions described above allow for realization of the system 1 i.e. a system for matching one or more buyers with one or more sellers in a secondary marketplace to facilitate trade of mobile data.

Figure 6:
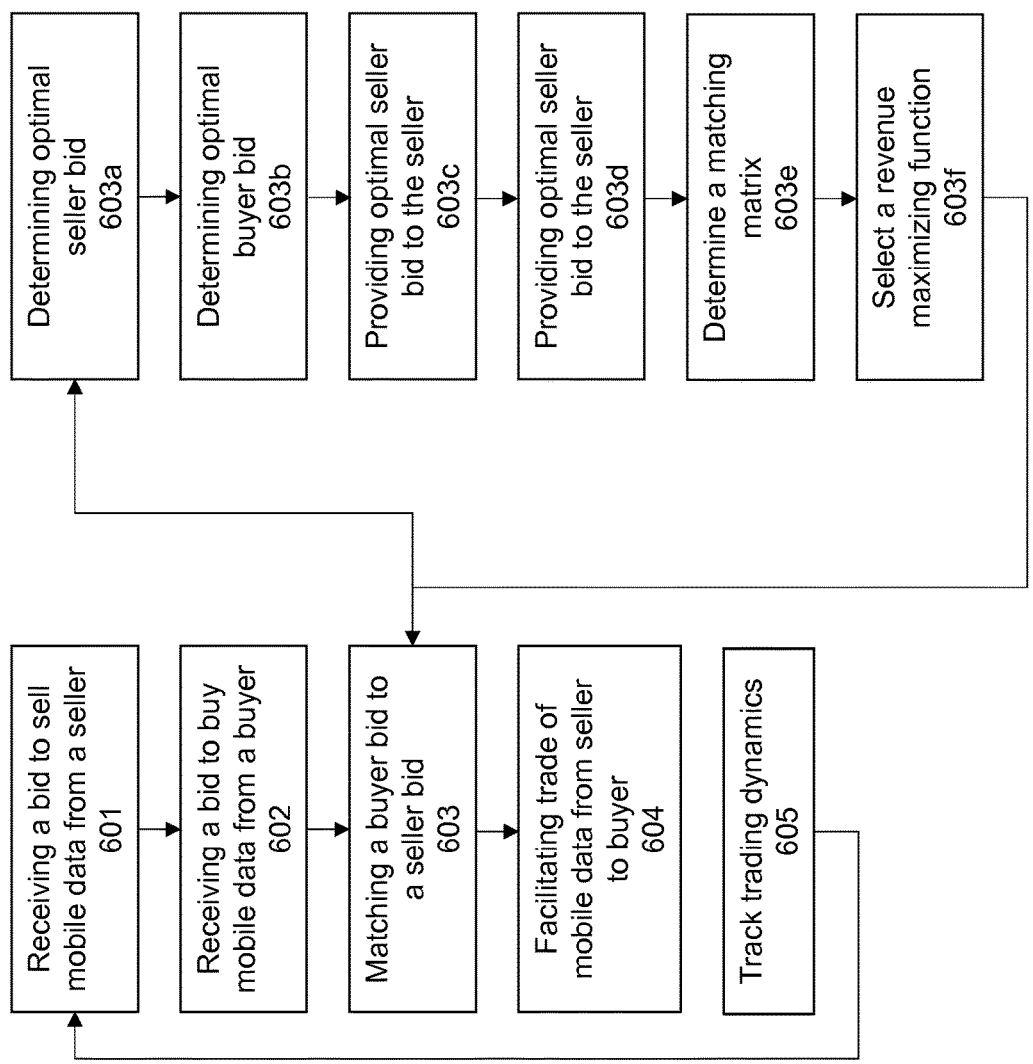

FIG. 6 shows a flow chart for a method for matching one or more buyers with one or more sellers to facilitate trade in an online marketplace, in particular to facilitate trade of mobile data. The method 600 is implemented by the service provider 600 and can be executed on the apparatus 100. The processor 102 is configured to execute the method, and the method can be stored as a set of executable instructions in a memory device, such as disk drive 108.

The method 600 begins at step 601, by receiving a bid to sell mobile data from one or more sellers. The method proceeds to step 602, and receives a bid to buy mobile data from one or more buyers. Step 603 involves matching at least a portion of the bid of the one or more buyers with at least a portion of the bid of the one more sellers based on a revenue maximizing function to maximize the revenue of the service provider 200. Once a seller 400 and buyer 300 are matched the method proceeds to step 604, that involves facilitating a trade of mobile data from the seller to the buyer. As part of the matching step, the processor is configured to automatically match the buyer and seller with each other based on the matching process. In such an embodiment the processor automates matching buyers and sellers and then facilitate transfer of money and data between the buyer and seller.

The mobile data trade is facilitated by the service provider and involves subtracting the amount of data agreed on from a seller mobile data account and transferring that amount of mobile data to a buyer mobile data account. The mobile data accounts of the buyer and seller are with the service provider 200. The method 600 is repeated. In an example the method 600 is repeated multiple times a month. In another example the method 600 is initialized on demand, meaning any time a seller and buyer submit bids.

The matching step involves a sub process to determine optimal matching of buyers with sellers. The sub process begins at step 603a. At step 603a an optimal seller bid is determined. The optimal seller bid is determined using a seller utility and seller utility maximization. The optimal seller bid accounts for different data amounts for sale by different sellers. The optimal bid can also account for future seller usage. The optimal seller bid maximizes the seller utility from selling an amount of mobile data. The seller utility and seller utility maximization is determined using the mathematical expressions disclosed above (2)-(5). The optimal seller bid is also determined using the expressions, as described earlier.

The sub process moves to step 603b. At Step 603b comprises determining an optimal buyer bid. The optimal buyer bid is determined using a buyer utility and buyer utility maximization. The optimal buyer bid accounts for different usages by different buyers. The optimal buyer bid can also account for future buyer usages. The buyer utility and buyer utility maximization is determined using the mathematical expressions (5)-(8). These expressions are also used to determine an optimal buyer bid as described earlier.

The sub process proceeds to step 603c where the optimal seller bid is provided to a seller 400. The seller 400 can optionally update their bid to match the suggested optimal seller bid. The optimal seller bid provides maximum utility for the seller from selling data and provides maximum chances for the seller bid to be matched with a buyer bid. In other examples the seller 400 may not update their bid. The optimal seller bid is a suggested bid, by the processor, that would result in maximum matching or would result in the seller being able to achieve a sale.

The sub process proceeds to step 603d, that comprises the optimal buyer bid is provided to a buyer 300. The buyer 300 can optionally update their bid to match the suggested optimal buyer bid. The optimal buyer bid provides maximum utility for the buyer and provides maximum chances for the buyer bid to be matched with a seller bid. In other examples the buyer 300 may not update their bid. The optimal buyer bid is a suggested bid, by the processor, that would result in maximum matching or would result in the buyer being able to achieve a purchase of data.

Step 603e of the sub process comprises determining a matching matrix to match the buyer bid with seller bid. The matching matrix can be determined as per the above mathematical expressions (10)-(13). Other expressions can also be used and are contemplated.

Following the matching matrix determination, the sub process moves to step 603f. Step 603f comprises determining a revenue maximizing function. The revenue maximizing function is used to determine a relationship to maximize ISP revenue. The revenue maximizing function and the matching matrix are used to match buyers and sellers. The revenue maximizing function is determined using the mathematical expressions described earlier, in particular using expression (14).

In an alternate embodiment the step of matching 603 can also comprise presenting a buyer or seller with bids. In this alternative embodiment the matching step can also comprise the additional step of providing a seller with one or more buyer bids, preferably a plurality of buyer bids to the seller. The buyer bids provided to the seller can be derived using the matching process as described. The seller can select the buyer bid that best appeals to the seller. In an alternative embodiment the matching step can also comprise the additional step of providing a buyer with one or more seller bids, preferably a plurality of seller bids to the buyer. The sellers bids provided to the buyer can be derived using the matching process as described. The buyer can select the seller bid that best appeals to the buyer. The processor is configured to facilitate transfer of data based on the selected bids by the buyer and seller, providing the selected bids match each other. In an alternative embodiment the seller and/or buyer can select which bid to select.

In a further alternative embodiment the sub process may not comprise the step of 603f. The matching process can be based on achieving utility maximization for the seller and buyer with no revenue for the service provider. In this embodiment where the service provider receives no revenue, the secondary marketplace is a free market. The service provider provides the market place and also tracks the amount of data traded. The service provider reflects the traded data on a user's (i.e. buyer's or seller's) bill. In this embodiment the buyer and seller are existing customers of the service provider. Buyers and sellers who want to interact and take part in the secondary market are required to sign up with the service provider to gain access the matching functionality provided by the service provider processor.

The present invention provides a number of advantages. Selling mobile data in the marketplace (i.e. in a secondary market), is more advantageous than a primary market where there is no mobile data trade between the buyers and sellers. The present invention, determining optimal bids for the buyers and sellers and determining an optimal matching is more advantageous because it provides trading of mobile data among users, while still maximizing the ISP revenue. The expressions described above allow an ISP to create an additional revenue source for itself that is maximized.

Further the use of the expressions in the system 1 and with the apparatus 100 is also advantageous for buyers and sellers, because it allows buyers to obtain data from an alternate source for an optimal price which is often cheaper than buying data from the ISP. The expression also allows for the buyer to acquire data above and beyond than data caps set by ISPs for cheaper than paying overage fees. The use of the invention, based on the expressions described above allows a seller to sell mobile data that is unused by the seller to strangers and allow the seller to gain an extra income. The apparatus determines utility maximization for the buyers and sellers allows the buyers and sellers to gain the best deal. The present invention is also further advantageous because it allows an ISP to generate more revenue facilitating mobile data trading on a secondary market, as compared to selling data to users in a primary market.

The present apparatus and method as described is also advantageous because it allows improved matching of the buyers with sellers, using the expressions described above. The apparatus and method of the present invention using the mathematical models described above provide for improved matching to maximize the amount of mobile data traded. The use of the matching expression is further advantageous because it accounts for different usage amounts of the different buyers and sellers, while maximizing matching of buyers to sellers. This is advantageous for sellers and buyers because their utility is maximized leading to an increased consumer satisfaction and improved consumer satisfaction by using present invention. This will lead to more and more consumers using the apparatus, leading to increased consumer base for the service provider (i.e. ISP).

In an alternative embodiment described herein is an embodiment in which the service provider receives no revenue i.e. the secondary market is a free market. The service provider can facilitate trade or mobile data and provide a secondary market, i.e. host the secondary market. This is advantageous because buyers and sellers can trade mobile data for free, which allows buyers and sellers to trade data more freely and provide for greater participation in the secondary market of mobile data. This can be advantageous for the service provider since the free secondary market can allow for an increased involvement in the secondary market. The service provider can have access to a greater number of potential customers due to the increased number of buyers and sellers participating in the secondary market.

The invention is described with respect to mobile data such as mobile internet data. The invention as described can be embodied or applied to other assets. For example the invention can be used for share trading, mobile calling minutes, mobile text messages, financial instruments, securities and other assets that can be traded on a secondary market. While the invention has been described with reference to a number of preferred embodiments it should be appreciated that the invention can be embodied in many other forms.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the present invention are either wholly implemented by computing system or partly implemented by computing systems then any appropriate computing system architecture may be utilised. This will include stand alone computers, network computers and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A method for facilitating trade of mobile data in an online marketplace provided by a service provider, the method comprising steps of:
   receiving from one or more sellers who are customers of the service provider, and via a user interface, respective seller bids to sell unused mobile data, each respective seller bid including information related to an amount of unused mobile data the corresponding seller wants to sell and a corresponding price the corresponding seller wants to receive,
   receiving from one or more buyers who are customers of the service provider, and via the user interface, respective buyer bids to buy unused mobile data, each respective buyer bid including an amount of unused mobile data the corresponding buyer wants to buy and a corresponding price the corresponding buyer wants to pay,
   facilitating, using a processor operably connected with the user interface, matching of at least a portion of a buyer bid with at least a portion of a seller bid based on: a revenue maximization function to maximize the service provider's revenue based on a relationship between an administration revenue and a bid revenue, the administration revenue being generated by the service provider charging an administration fee for matching the one or more buyers with the one or more sellers, the administration fee being proportional to an amount of unused mobile data to be traded, and the bid revenue being generated by the difference between the buyer bid and the seller bid that are matched;
   wherein the facilitating step comprises steps of:
   determining, using the processor, an optimal seller bid for each of the one or more sellers by respectively:
   determining a seller utility that relates to utility from selling mobile data, taking into account anticipated future usage and usage habit of the seller; and
   determining a seller utility maximization that relates to the maximum amount of data the respective seller is willing to sell as a function of a bid value;
   wherein the seller utility maximization is mathematically determined using the seller utility, and the seller utility maximization is determined as an amount of data to be sold by the seller, using a mathematical relationship relating at least the administration fee, seller price, mobile data cap of the corresponding seller, and leftover mobile data of the corresponding seller prior to selling; and
   determining, using the processor, an optimal buyer bid for each of the one or more buyers by respectively:
   determining a buyer utility that relates to the utility of the respective buyer from buying mobile data, taking into account anticipated future usage and usage habit of the buyer; and
   determining a buyer utility maximization that relates to the maximum amount mobile data the respective buyer is willing to buy as a function of the bid value;
   wherein the buyer utility maximization is determined as an amount of data to be purchased, using a mathematical relationship relating at least the amount of data to be purchased with a buyer's price, a mobile data cap of the buyer and the buyer's expected monthly usage;
   providing, via the user interface, the optimal buyer bid as a suggested bid to the respective one or more sellers;
   providing, via the user interface, the optimal seller bid as a suggested bid to the respective one or more buyers;
   receiving, from one or more sellers, via the user interface, a respective updated seller bid; and
   receiving, from one or more buyers, via the user interface, a respective updated buyer bid;
      matching, using the processor, based on the facilitating step, at least the portion of the buyer bid with at least the portion of the seller bid;
      transferring, using the processor, the amount of unused mobile data to be traded from the one or more sellers to the one or more buyers, following the matching of the one or more buyers with the one or more sellers, through the service provider;
      updating, at a storage device operably connected with the processor, account information of the one or more matched buyers and the one or more matched sellers based on the step of transferring, to correspondingly increase an amount of useable mobile data of the one or more matched buyers and correspondingly decrease an amount of useable mobile data of the one or more matched sellers; and
      facilitating, using the processor, a transfer of funds between the respective one or more sellers and the respective one or more buyers, following the matching of the one or more buyers with the one or more sellers, wherein the processor is in electronic communication with a web server, the online marketplace being an online web based marketplace that is hosted by the web server, and wherein the user interface is a web interface that allows interaction between the one or more buyers, the one or more sellers, and the processor, and further comprising a step of tracking, using the processor, trading dynamics of the online marketplace, wherein the step of tracking trading dynamics comprises steps of determining the bid value of the respective buyer bids supplied by the one or more buyers and the bid value of the respective seller bids supplied by the one or more sellers; and determining a number of the matchings of the one or more buyers and the one or more sellers.

2. The method in accordance with claim 1, wherein the step of determining the optimal seller bid comprises a step of determining an optimal amount of mobile data the corresponding seller is willing to sell as a function of the bid value.

3. The method in accordance with claim 1, wherein the seller utility is determined using a seller utility expression defined as:

$$(o_j^s - s_j^\star)(\sigma_J - \rho) = V_j^s(d_j^s - s_j^\star) - \int_{d_j^s - o_j^s}^{d_j^s - s_j^\star} V_j^s(c_j^s) f(c_j^s) dc_j^s;$$

wherein $s^*_j$ is the optimal seller bid, $o_j^s$ relates to leftover data of the corresponding seller, $\sigma_j$ relates to the seller price, $\rho$ relates to the administration fee, $f(c_j^s)$ relates to a delta distribution of the seller mobile data usage and;

wherein the optimal seller bid can be mathematically determined using the seller utility expression.

4. The method in accordance with claim 1, wherein the seller utility maximization is determined using the following expression:

Initialize $s(o) \in (0, o^s)$:

1) The jth seller updates the data caps to be sold:

$$s_j(k+1) = o_j^s - \frac{1}{\sigma_j - \rho} V_j^s(d_j^s - s_j(k)) + \frac{1}{\sigma_j - \rho} \int_{d_j^s - o_j^s}^{d_j^s - s_j(k)} V_j^s(c_j^s) f(c_j^s) dc_j^s;$$

2) Normalize $s_j(k+1)$:

$$s_j(k+1) \leftarrow \min\left\{s_j(k+1), d_j^s - \left(\frac{\theta_j^s(d_j^s + \alpha_j^s \, o_j^s)}{2d_j^s(\sigma - \rho)}\right)^{\frac{1}{\alpha_j^s}}\right\}$$

wherein the utility maximization expression is used to determine amount of data a corresponding seller should sell for achieving maximum utility, wherein $s_j(k+1)$ relates to the amount of data the corresponding seller should sell, which relates to the optimal seller bid.

5. The method in accordance with claim 1, wherein the step of determining the optimal buyer bid comprises a step of determining an optimal amount of mobile data the respective buyer is willing to buy as a function of the bid value.

6. The method in accordance with claim 1, wherein, the buyer utility is determined using a buyer utility function defined as:

$$(o_l^b + b_l^\star)\pi_l = V_l^b(d_l^b + b_l^\star) - \int_{d_l^b - o_l^b}^{d_l^b + b_l^\star} V_l^b(c_l^b) f(c_l^b) dc_l^b$$

wherein $b^*_l$ relates to the optimal buyer bid, $o_l^b$ relates to leftover mobile data for the buyer, $d_l^b$ relates to the data cap for the buyer, $c_l^b$ relates to monthly usage of the buyer, $f(c_l^b)$ relates to the a random variable with a distribution between the minimum buyer data usage and maximum buyer data usage, $\pi_l$ relates to purchase price of the buyer; and wherein the optimal buyer bid can be mathematically determined using the buyer utility function.

7. The method in accordance with claim 1, wherein the buyer utility maximization is determined using the following expression:

Initialize $b(0) \in \mathbb{R}_+^L$:

1) The lth buyer updates the amount of data to be purchased:

$$b_l(k+1) = \frac{1}{\pi_l} V_l^b(d_l^b + b_l(k)) - \frac{1}{\pi_l} \int_{d_l^b - o_l^b}^{d_l^b + b_l(k)} V_l^b(c_l^b) f(c_l^b) dc_l^b - o_l^b;$$

2) Normalize $b_l(k+1)$:

$$b_l(k+1) \leftarrow \min\left\{b_l(k+1), \left(\frac{\theta_l^b(d_l^b + \alpha_l^b \, o_l^b)}{2d_l^b \pi_l}\right)^{\frac{1}{\alpha_l^b}} - d_l^b\right\};$$

wherein the buyer utility maximization expression is used to determine amount of data the buyer should buy to achieve utility maximization and wherein $b_l(k+1)$ relates to the amount of mobile data the buyer should purchase.

8. The method in accordance with claim 4, wherein the revenue maximization function comprises:

a matching matrix that relates a percentage of a buyer bid that is satisfied by the seller bid; and the method further comprises:

maximizing the matching matrix to determine a maximum revenue for the service provider.

9. The method in accordance with claim 8, wherein the maximizing the matching matrix and the revenue maximization function are determined by solving the linear program:

$$\underset{\Omega}{\text{maximize}} \; \omega \rho \sum_{j=1}^{J} \sum_{l=1}^{L} \Omega_{l_j} b_l$$

$$(1 - \omega) \sum_{l=1}^{L} \sum_{j=1}^{J} \left(\Omega_{l_j} b_l \pi_l - \Omega_{l_j} b_l \sigma_l\right)$$

Subject to $\Omega \in B \cap S \cap \Pi \cap \Sigma; \Omega \geq 0$:

wherein $\Omega$ relates to the matching matrix, $$\rho \sum_{j=1}^{J} \sum_{l=1}^{L} \Omega_{l_j} b_l$$

relates to the administration revenue, $$(1-\omega)\sum_{l=1}^{L}\sum_{j=1}^{J}\left(\Omega_{l_j}b_l\pi_l - \Omega_{l_j}b_l\sigma_l\right)$$

relates to the bid revenue, $\Omega \in B \cap S \cap \Pi \cap \Sigma; \Omega \geq 0$ relate to matching constraints for a buyer bid and a seller bid, the linear program outputting a maximized matching matrix, and ω relates to a weighting parameter that controls whether the matching matrix is more weighted toward revenue from administration revenue or bid revenue.

10. The method in accordance with claim 9, wherein the matching constraints comprise:
a buyer constraint based on the buyer price and the buyer amount of data;
a seller constraint based on the seller price and the seller amount of data;
a total money exchanged constraint, based on the relationship that the total money paid by all buyers for seller data must be at least the cost of the data.

11. The method in accordance with claim 9, wherein the weighting parameter is adjustable.

12. A system for facilitating trade of mobile data in an online marketplace provided by a service provider, the system comprising:
a user interface configured to:
receive, from one or more sellers who are customers of the service provider, respective seller bids to sell unused mobile data, each respective seller bid including information related to a corresponding price the corresponding seller wants to receive; and
receive, from one or more buyers who are customers of the service provider, respective buyer bids to buy unused mobile data, each respective buyer bid including information related to a corresponding price the corresponding buyer is willing to pay;
a processor in electronic communication with the user interface, the processor being configured to:
execute a facilitation operation to facilitate matching of at least a portion of a buyer bid with at least a portion of a seller bid based on: a revenue maximization function that is arranged to maximize a service provider's revenue based on a relationship between an administration revenue and a bid revenue, the administration revenue being generated by the service provider charging an administration fee for matching the one or more buyers with the one or more sellers, the administration fee being proportional to an amount of unused mobile data to be traded, and the bid revenue being generated by the difference between the buyer bid and the seller bid that are matched,
matching, based on the facilitation operation, at least the portion of the buyer bid with at least the portion of the seller bid;
transfer the amount of unused mobile data to be traded from the one or more sellers to the one or more buyers following the matching of the one or more sellers with the one or more buyers, through the service provider;
provide instruction or information to a storage device to update account information of the one or more matched buyer and the one or more matched sellers based on the transfer, so as to correspondingly increase an amount of useable mobile data of the one or more matched buyer and correspondingly decrease an amount of useable mobile data of the one or more matched seller; and
facilitate a transfer of funds between the respective one or more sellers and the respective one or more buyers, following the matching of the one or more buyers with the one or more sellers; and
the storage device operably connected with the processor and holding mobile data accounts of the one or more buyer and of the one or more sellers, the storage device being configured to:
receive the instruction or information from the processor to update account information of the one or more matched buyer and the one or more matched sellers based on the facilitated transfer, to correspondingly increase an amount of useable mobile data of the one or more matched buyer and correspondingly decrease an amount of useable mobile data of the one or more matched seller;
wherein the processor is arranged to execute the facilitation operation by: determining an optimal seller bid for each of the one or more sellers, including, respectively:
determining a seller utility that relates to utility from selling mobile data, taking into account anticipated future usage and usage habit of the seller; and
determining a seller utility maximization that relates to the maximum amount of mobile data the respective seller is willing to sell as a function of a bid value;
wherein the seller utility maximization is mathematically determined using the seller utility, and the seller utility maximization is determined as an amount of mobile data to be sold by the seller, using a mathematical relationship relating at least the administration fee, seller price, mobile data cap of the corresponding seller, and leftover mobile data of the corresponding seller prior to selling; and
determining an optimal buyer bid for each of the one or more buyers, including, respectively:
determining a buyer utility that relates to the utility of the respective buyer from buying mobile data, taking into account anticipated future usage and usage habit of the buyer; and
determining a buyer utility maximization that relates to the maximum amount of mobile data the respective buyer is willing to buy as a function of the bid value;
wherein the buyer utility maximization is determined as an amount of mobile data to be purchased, using a mathematical relationship relating at least the amount of mobile data to be purchased with a buyer's price, a mobile data cap of the buyer, and the buyer's expected monthly usage;
wherein the user interface is further configured to perform the following as part of the facilitation operation:
provide the optimal buyer bid as a suggested bid to the respective one or more sellers;
provide the optimal seller bid as a suggested bid to the respective one or more buyers;
receive, from one or more sellers, a respective updated seller bid; and
receive, from one or more buyers, a respective updated buyer bid,
wherein the processor is in electronic communication with a web server, the online marketplace being an online web based marketplace that is hosted by the web server, and wherein the user interface is a web interface that allows interaction between the one or more buyers, the one or more sellers, and the processor, and wherein the processor is further configured to track trading dynamics of the online marketplace, determine a value of bids from the one or more buyers and a value of bids from the one or more sellers, and determine the matching of the one or more buyers and the one or more sellers.

13. The system in accordance with claim 12, wherein the processor is configured to determine seller utility by executing the following expression:

$$(o_j^s - s_j^\star)(\sigma_J - \rho) = V_j^s(d_j^s - s_j^\star) - \int_{d_j^s - o_j^s}^{d_j^s - s_j^\star} V_j^s(c_j^s) f(c_j^s) dc_j^s;$$

wherein $s^\star_j$ is the optimal seller bid, $o_j^s$ relates to leftover data of the corresponding seller, $\sigma_j$ relates to the seller price, $\rho$ relates to the administration fee, $f(c_j^s)$ relates to a delta distribution of the seller mobile data usage and; wherein the expression is stored as is stored as a set of executable instructions on a non-transitory computer readable medium, the processor arranged to execute the instructions to determine the seller utility.

14. The system in accordance with claim 12, wherein the processor is configured to determine the buyer utility by executing the following expression:

$$(o_l^b + b_l^\star)\pi_l = V_l^b(d_l^b + b_l^\star) - \int_{d_l^b + o_l^b}^{d_l^b + b_l^\star} V_l^b(c_l^b) f(c_l^b) dc_l^b;$$

wherein $b^\star_l$ relates to the optimal buyer bid, $o_l^b$ relates to leftover mobile data for the buyer, $d_l^b$ relates to the data cap for the buyer, $c_l^b$ relates to monthly usage of the buyer, $f(c_l^b)$ relates to the a random variable with a distribution between the minimum buyer data usage and maximum buyer data usage, $\pi_l$ relates to purchase price of the buyer and; wherein the expression is stored as a set of executable instructions on a non transitory computer readable medium, the processor arranged to execute the instructions to determine the buyer utility.

15. The system in accordance with claim 12, wherein the processor is configured to determine a matching matrix that relates a percentage of a buyer bid that is satisfied by the seller bid; and select revenue maximization function that maximizes the matching matrix in order to achieve optimal matching of the buyers and sellers.

16. The system in accordance with claim 12, wherein the processor is configured to determine seller utility maximization by executing the following expression:
Initialize $s(o) \in (0, o^s)$:
1) The jth seller updates the data caps to be sold:

$$s_j(k+1) = o_j^s - \frac{1}{\sigma_j - \rho} V_j^s(d_j^s - s_j(k)) + \frac{1}{\sigma_j - \rho} \int_{d_j^s - o_j^s}^{d_j^s - s_j(k)} V_j^s(c_j^s) f(c_j^s) dc_j^s;$$

2) Normalize $s_j(k+1)$:

$$s_j(k+1) \leftarrow \min\left\{ s_j(k+1), d_j^s - \left( \frac{\theta_j^s(d_j^s + \alpha_j^s \ o_j^s)}{2 d_j^s (\sigma - \rho)} \right)^{\frac{1}{\alpha_j^s}} \right\}$$

wherein the utility maximization expression is used to determine amount of data a corresponding seller should sell for achieving maximum utility, wherein $s_j(k+1)$ relates to the amount of data the corresponding seller should sell, which relates to the optimal seller bid, and
wherein the expression is stored as a set of executable instructions on a non-transitory computer readable medium, the processor arranged to execute the instructions to determine the seller utility maximization.

17. An apparatus in accordance with claim 12, wherein the processor is arranged to determine buyer utility maximization by executing the following expression:
Initialize $b(0) \in \mathbb{R}_+^L$:
1) The lth buyer updates the amount of data to be purchased:

$$b_l(k+1) = \frac{1}{\pi_l} V_l^b(d_l^b + b_l(k)) - \frac{1}{\pi_l} \int_{d_l^b - o_l^b}^{d_l^b + b_l(k)} V_l^b(c_l^b) f(c_l^b) dc_l^b - o_l^b;$$

2) Normalize $b_l(k+1)$:

$$b_l(k+1) \leftarrow \min\left\{ b_l(k+1), \left( \frac{\theta_l^b(d_l^b + \alpha_l^b \ o_l^b)}{2 d_l^b \pi_l} \right)^{\frac{1}{\alpha_l^b}} - d_l^b \right\};$$

wherein the buyer utility maximization expression is used to determine amount of data the buyer should buy to achieve utility maximization and wherein $b_l(k+1)$ relates to the amount of mobile data the buyer should purchase, and
wherein the expression is stored as a set of executable instructions on a non-transitory computer readable medium, the processor arranged to execute the stored instructions to determine buyer utility maximization.

18. The system in accordance with claim 15, wherein the matching matrix and the revenue maximization function are determined by solving the following expression:

$$\underset{\Omega}{\text{maximize}} \ \omega \rho \sum_{j=1}^{J} \sum_{l=1}^{L} \Omega_{l_j} b_l + (1-\omega) \sum_{l=1}^{L} \sum_{j=1}^{J} \left( \Omega_{l_j} b_l \pi_l - \Omega_{l_j} b_l \sigma_l \right)$$

subject to $\Omega \in B \cap S \cap \Pi \cap \Sigma; \Omega \geq 0$:

wherein $\Omega$ relates to the matching matrix, $$\rho \sum_{j=1}^{J} \sum_{l=1}^{L} \Omega_{l_j} b_l$$

relates to the administration revenue, $$(1-\omega) \sum_{l=1}^{L} \sum_{j=1}^{J} \left( \Omega_{l_j} b_l \pi_l - \Omega_{l_j} b_l \sigma_l \right)$$

relates to the bid revenue, $\Omega \in B \cap S \cap \Pi \cap \Sigma; \Omega \geq 0$
relate to matching constraints for a buyer bid and a seller bid, the linear program outputting a maximized matching matrix, and;

ω relates to a weighting parameter that controls whether the matching matrix is more weighted toward revenue from administration revenue or bid revenue, and wherein the expression is stored as a set of executable instructions on a non-transitory computer readable medium, the processor arranged to execute the stored instructions to determine the matching matrix and revenue maximization function.

19. The system in accordance with claim 18, wherein the weighting parameter is biased for increased revenue from administration revenue.

20. The method in accordance with claim 18, wherein the weighting parameter is adjustable.

21. The system in accordance with claim 18, wherein the weighting parameter is biased for increased revenue from bid revenue.

22. The system in accordance with claim 18, wherein the weighting parameter is biased to a value of 1 to maximize matching and weight toward the revenue being generated from administration revenue only.

* * * * *